US010832668B1

(12) United States Patent
Devries et al.

(10) Patent No.: US 10,832,668 B1
(45) Date of Patent: Nov. 10, 2020

(54) DYNAMIC SPEECH PROCESSING

(71) Applicant: Amazon Technologies, Inc., Seattle, WA (US)

(72) Inventors: David William Devries, San Jose, CA (US); Rajesh Mittal, Milpitas, CA (US)

(73) Assignee: Amazon Technologies, Inc., Seattle, WA (US)

(*) Notice: Subject to any disclaimer, the term of this patent is extended or adjusted under 35 U.S.C. 154(b) by 102 days.

(21) Appl. No.: 15/709,167

(22) Filed: Sep. 19, 2017

(51) Int. Cl.
| *G10L 15/00* | (2013.01) |
| *G10L 15/22* | (2006.01) |
| *G10L 15/183* | (2013.01) |
| *G10L 15/18* | (2013.01) |
| *G10L 15/30* | (2013.01) |
| *G10L 15/14* | (2006.01) |
| *G10L 13/00* | (2006.01) |
| *G06F 40/169* | (2020.01) |
| *G06F 40/205* | (2020.01) |

(52) U.S. Cl.
CPC .............. *G10L 15/22* (2013.01); *G10L 13/00* (2013.01); *G10L 15/14* (2013.01); *G10L 15/183* (2013.01); *G10L 15/1815* (2013.01); *G10L 15/30* (2013.01); *G06F 40/169* (2020.01); *G06F 40/205* (2020.01); *G10L 2015/223* (2013.01)

(58) Field of Classification Search
CPC ....... G10L 15/22; G10L 15/265; G06F 3/167; H04M 2201/40
USPC ................................... 704/231–257, 270–275
See application file for complete search history.

(56) References Cited

U.S. PATENT DOCUMENTS

| 7,752,043 B2* | 7/2010 | Watson | G10L 15/32 |
| | | | 704/231 |
| 8,326,631 B1* | 12/2012 | Watson | G06F 16/7844 |
| | | | 704/270 |
| 8,473,293 B1* | 6/2013 | Mengibar | G10L 15/06 |
| | | | 704/10 |
| 9,105,267 B2* | 8/2015 | Okuno | G10L 15/22 |
| 2006/0247915 A1* | 11/2006 | Bradford | G06F 3/0481 |
| | | | 704/1 |
| 2007/0027693 A1* | 2/2007 | Hanazawa | G10L 15/32 |
| | | | 704/275 |
| 2016/0351190 A1* | 12/2016 | Piernot | G10L 15/22 |
| 2018/0228006 A1* | 8/2018 | Baker | H05B 47/105 |

* cited by examiner

*Primary Examiner* — Jesse S Pullias
(74) *Attorney, Agent, or Firm* — Pierce Atwood LLP

(57) ABSTRACT

Techniques for dynamically maintaining speech processing data on a local device for frequently input commands are described. One or more devices receive speech processing data specific to one or more commands associated with system input frequencies satisfying an input frequency threshold. The device(s) then receives input audio corresponding to an utterance and generate input audio data corresponding thereto. The device(s) performs speech recognition processing on input audio data to generate input text data using a portion of the received speech processing data. The device(s) determines a probability score associated with the input text data and determines the probability score satisfies a threshold probability score. The device(s) then performs natural language processing on the input text data to determine the command using a portion of the speech processing data. The device(s) then outputs audio data responsive to the command.

20 Claims, 19 Drawing Sheets

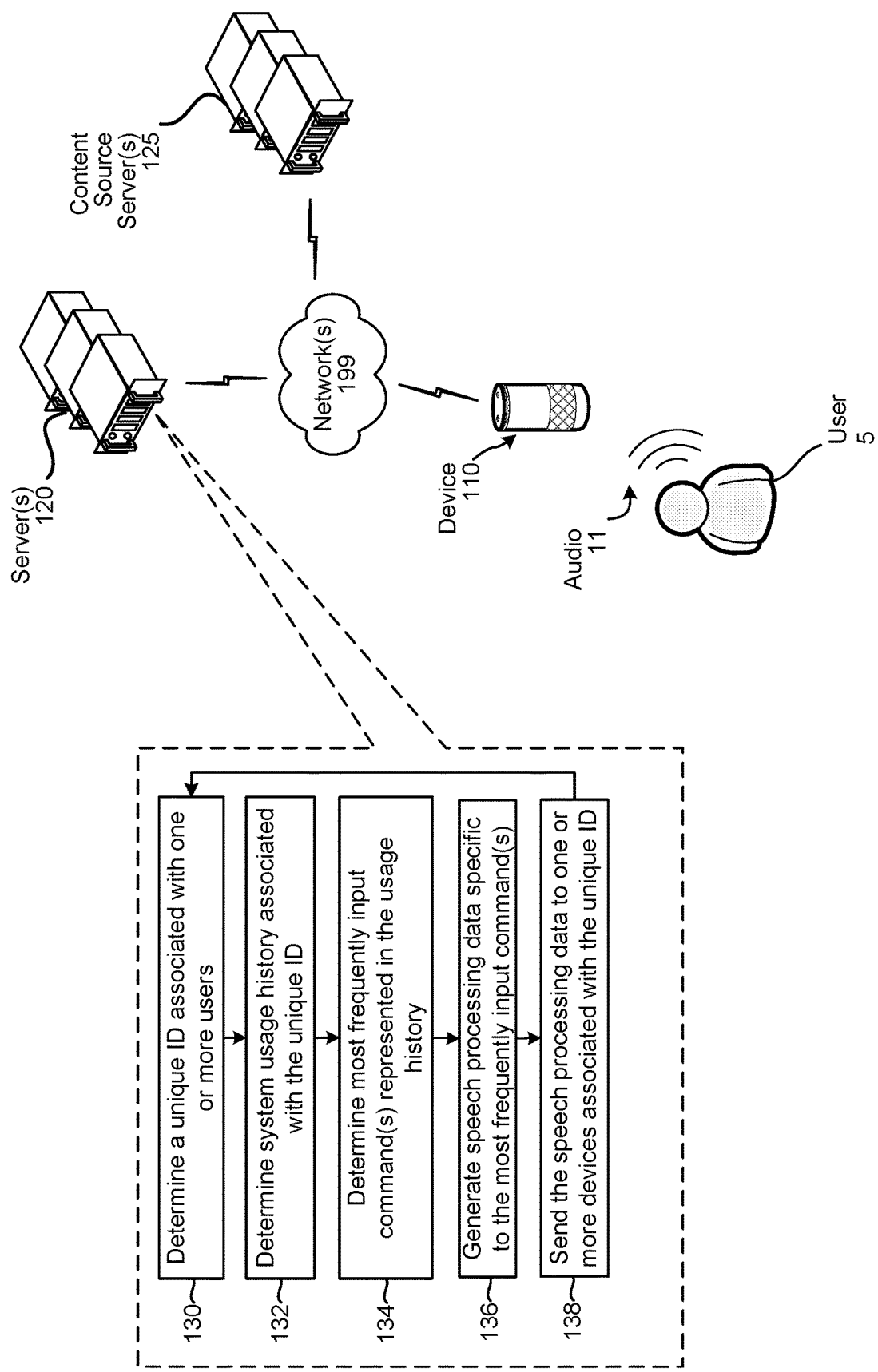

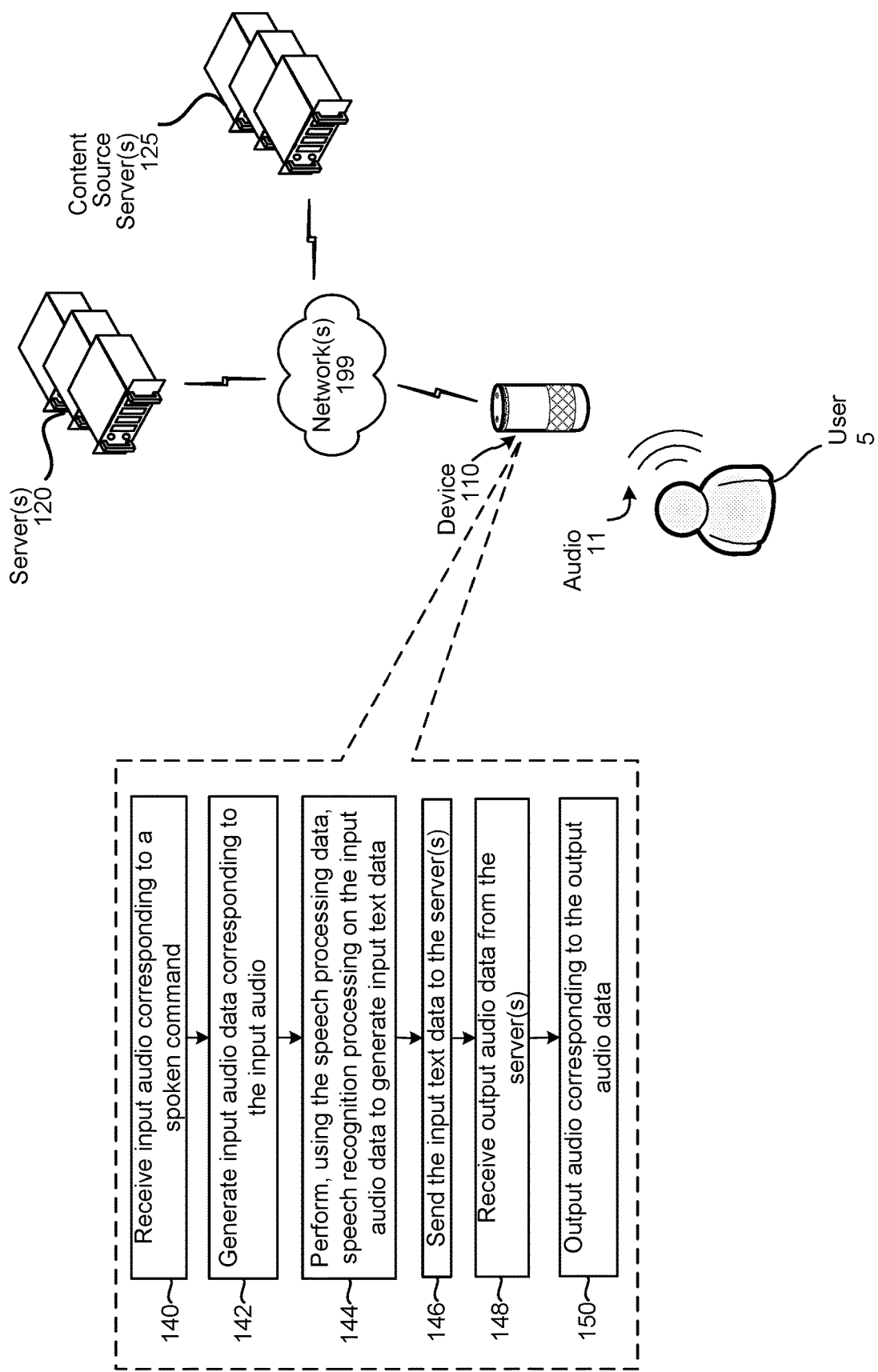

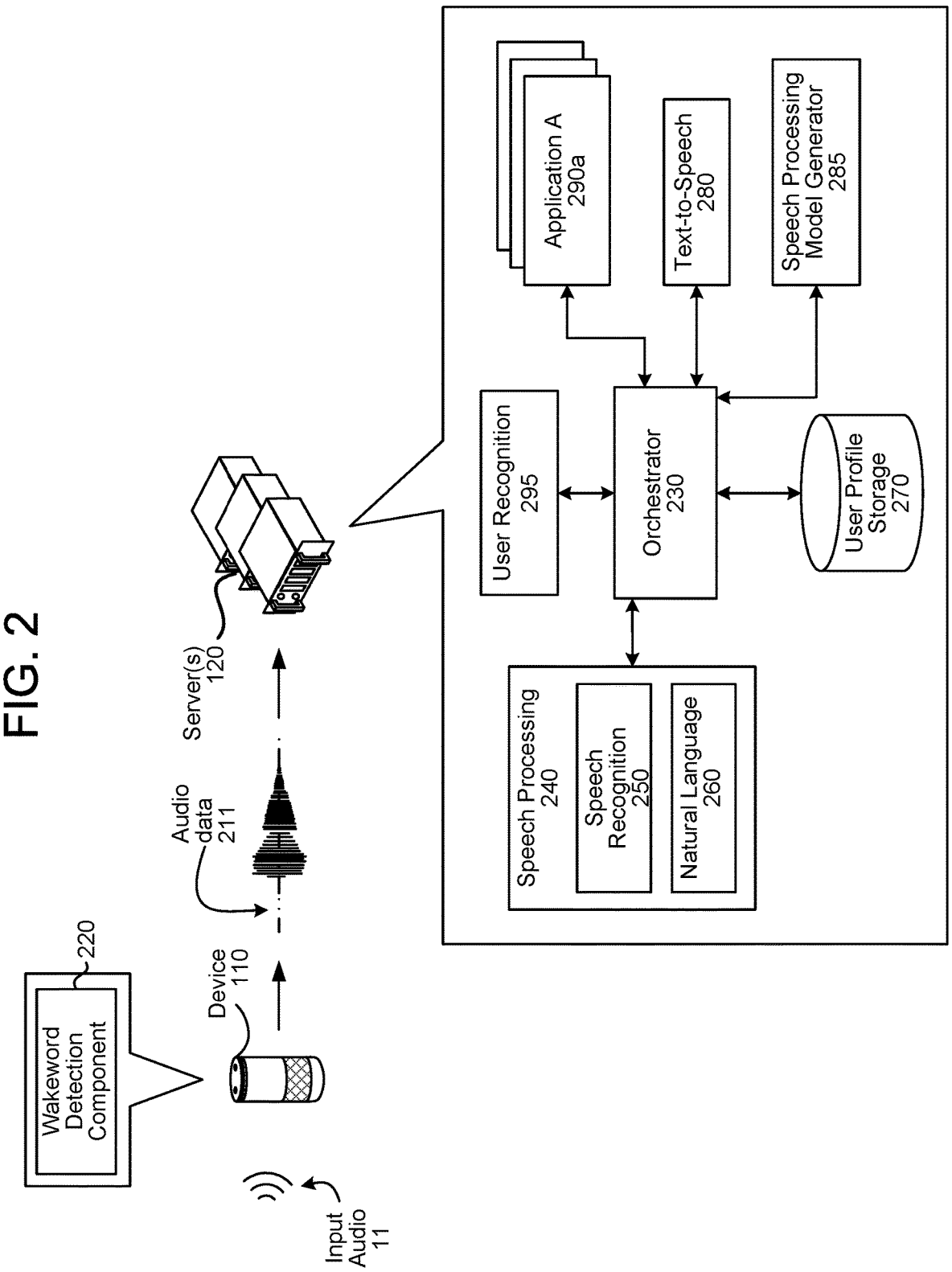

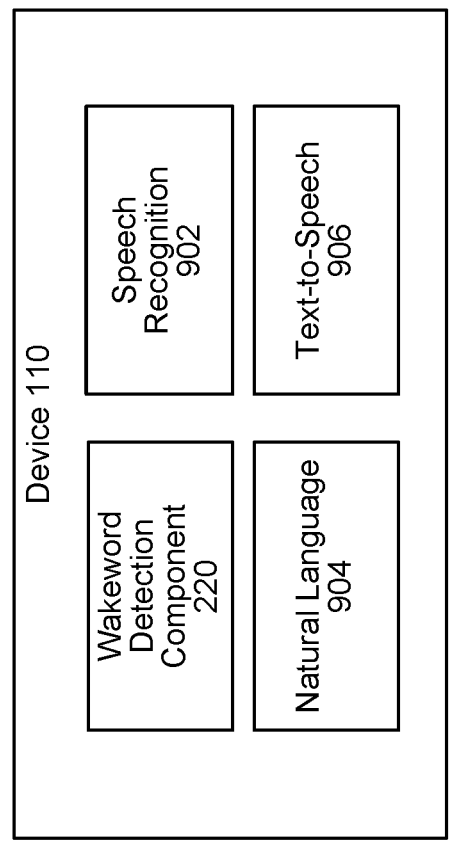

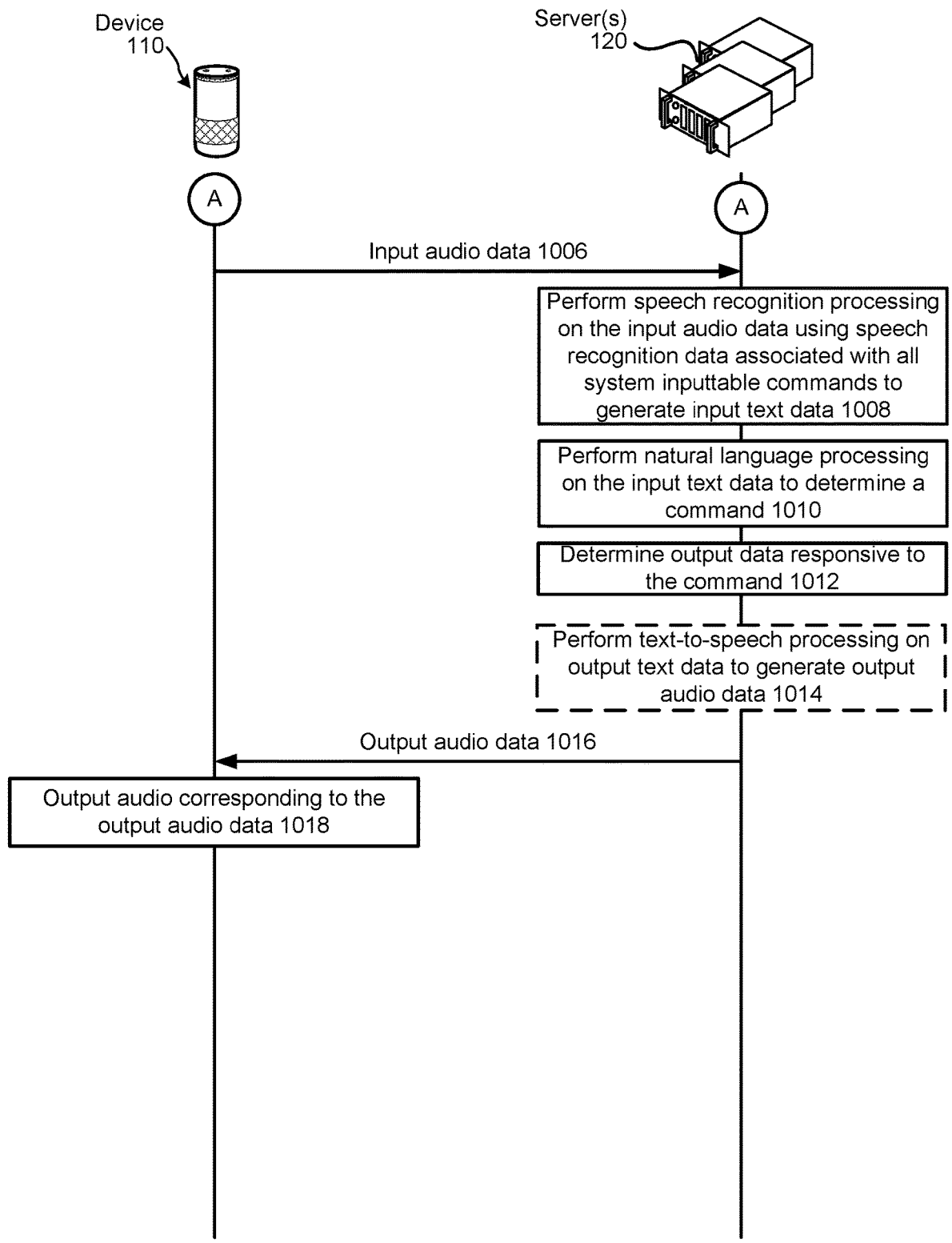

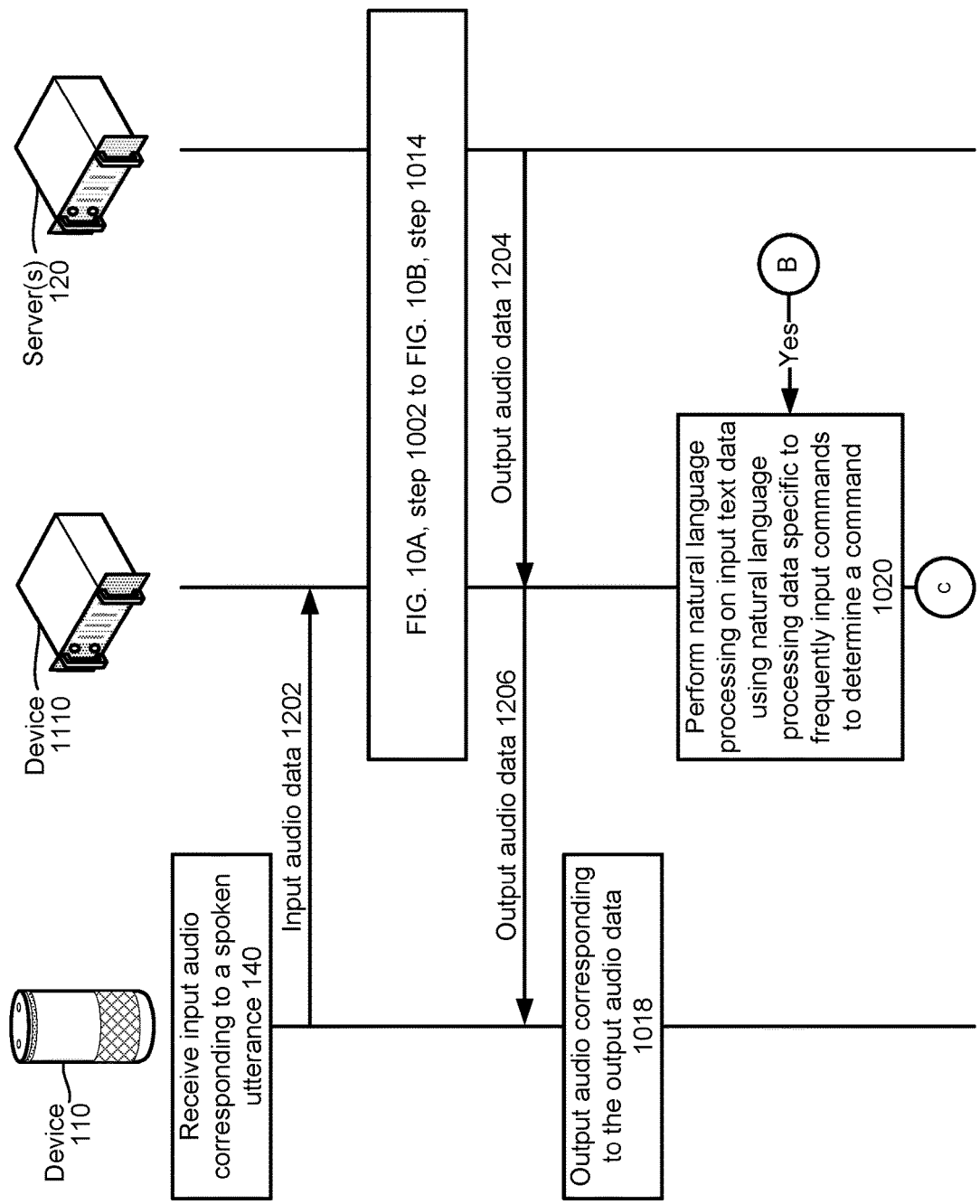

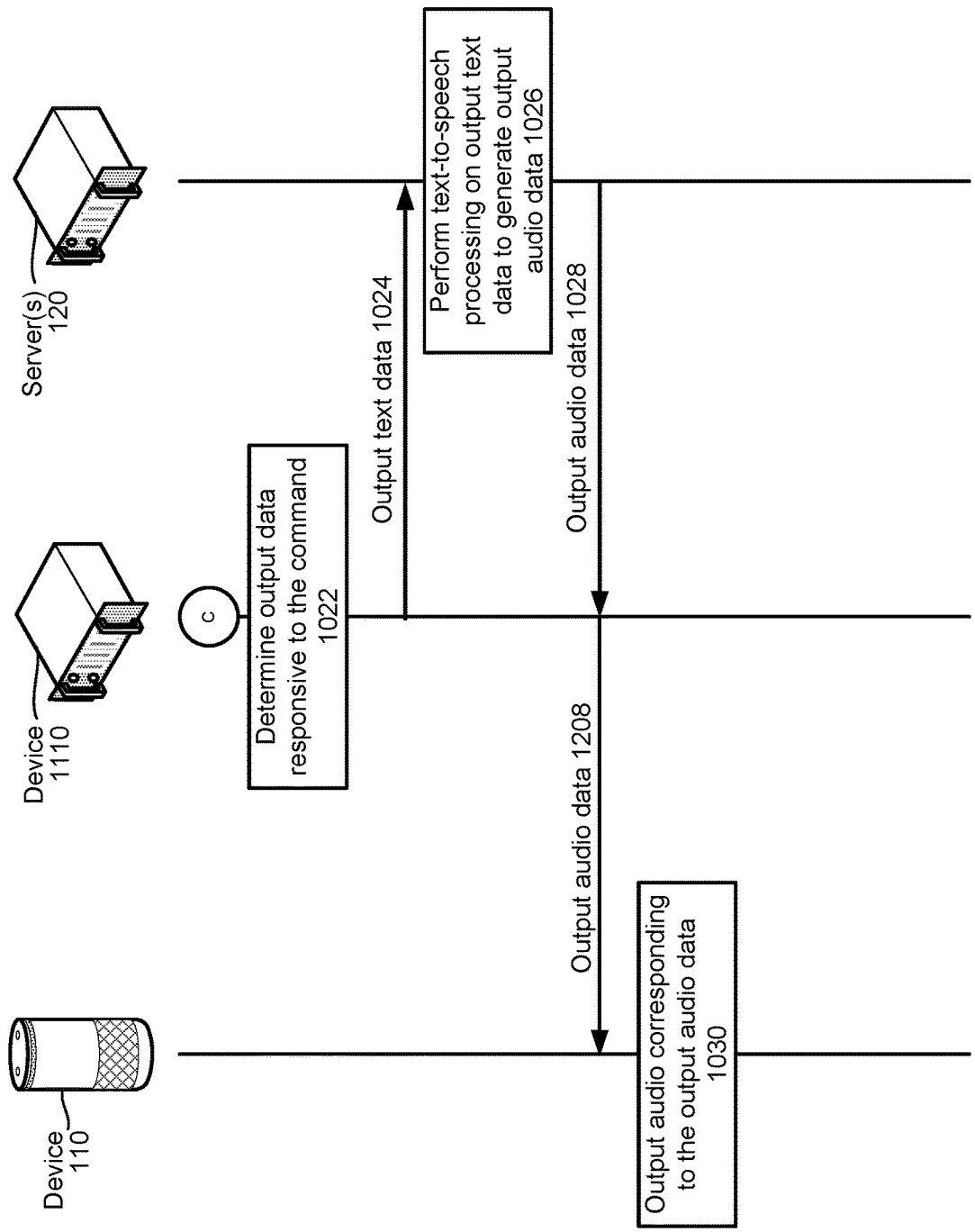

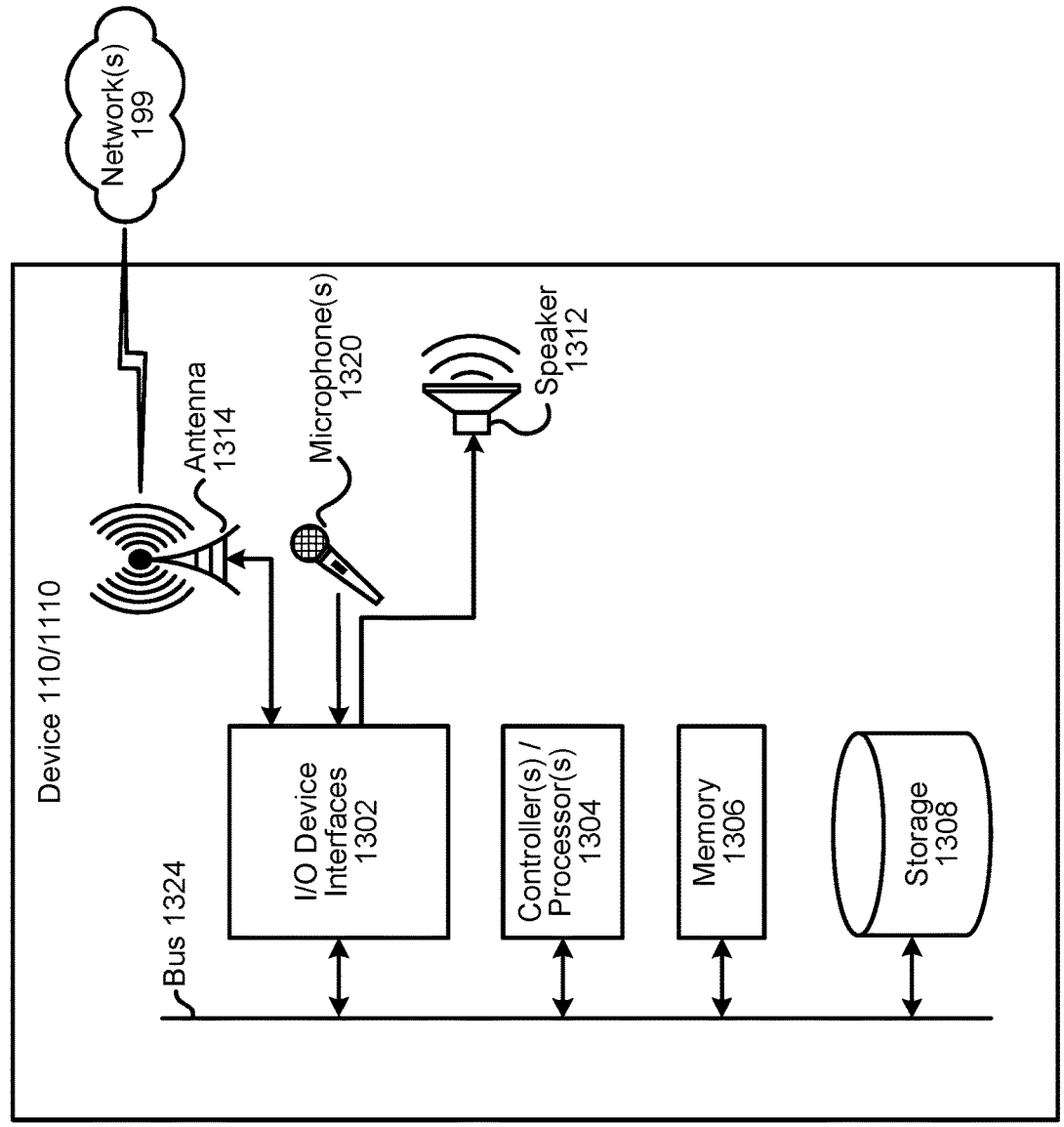

DYNAMIC SPEECH PROCESSING

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Text-to-speech enables a computing device to output synthesized speech, which may be used to respond to a user's spoken command. The combination of speech recognition, natural language understanding, and text-to-speech processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1A illustrates a system configured to store speech processing data specific to frequently input commands on a device local to a user according to embodiments of the present disclosure.

FIG. 1B illustrates a system configured to execute one or more commands using a device local to a user according to embodiments of the present disclosure.

FIG. 2 is a conceptual diagram of components of a system according to embodiments of the present disclosure.

FIG. 9 is a conceptual diagram of a device local to a user according to embodiments of the present disclosure.

FIGS. 10A and 10B are a signal flow diagram illustrating the execution of a command according to embodiments of the present disclosure.

FIGS. 12A and 12B are a signal flow diagram illustrating the execution of a command according to embodiments of the present disclosure.

FIG. 13 is a block diagram conceptually illustrating example components of a device according to embodiments of the present disclosure.

DETAILED DESCRIPTION

Figure 3:
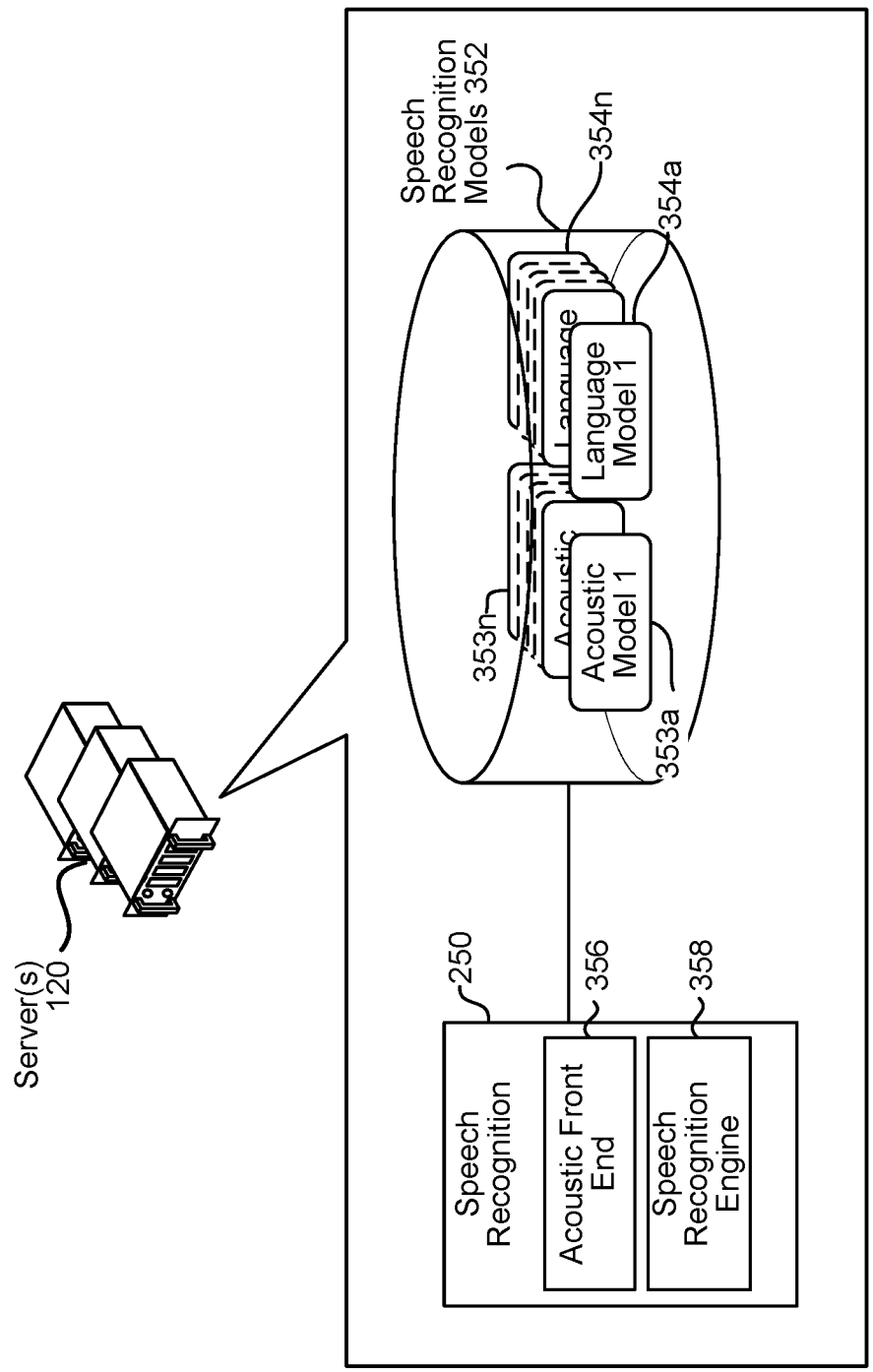
FIG. 3 is a conceptual diagram of how speech recognition processing is performed according to embodiments of the present disclosure.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language. Text-to-speech (TTS) is a field of computer science, artificial intelligence, and linguistics concerned with enabling computers to output synthesized speech. ASR, NLU, and TTS may be used together as part of a speech processing system.

A computing system may be configured to answer user commands requesting the output of content. A device local to a user may speak a command, for example, corresponding to "tell me the weather." The device may send audio corresponding to the command to one or more servers configured to perform speech processing. For example, the server(s) may perform speech recognition processing on the audio to determine text. The server(s) may then perform natural language processing on the text to determine the command. The server(s) determines content responsive to the command and causes the device local to the user to output the content.

The system may be configured to answer numerous commands. To enable the system to answer the commands, the server(s) may store large amounts of sample audio corresponding to known speech. The more commands the system is configured to answer, the larger the amount of sample audio the server(s) may be required to store.

Moreover, the system may be associated with a large number of users. Many of the users may speak commands to the system at any given moment. When multiple users speak commands at once, the server(s) may experience rather high load, thereby resulting in latency, due to the amount of speech recognition processing that needs to be performed at once.

The present disclosure provides a system that at least partially distributes speech recognition and natural language processing to devices local to users. One or more servers of the system determine one or more commands frequently input to the system by one or more users associated with one or more common devices. The server(s) determines speech recognition processing data and natural language processing data associated with the frequently input commands, and sends the speech recognition processing data and natural language processing data to the device(s). The device(s) locally stores the speech recognition processing data and natural language processing data. The server(s) may cause the speech recognition processing data and the natural language processing data stored by the device(s) to be updated to ensure the device(s) is capable of locally processing a threshold percentage of commands input thereto.

When the device(s) receives a command, the device(s) attempts to process the command locally. When the device(s) is able to process the command locally, such processing decreases the load experienced by the server(s) of the system. Moreover, by processing the command locally, user perceived latency is decreased (i.e., the system is able to output content corresponding to a device processed command more quickly than the system is able to output content corresponding to a server(s) processed command).

FIGS. 1A and 1B illustrate a system configured to process input commands using either a device local to a user or a server(s) in communication with the device. Although the figures and discussion illustrate certain operational steps of the system in a particular order, the steps described may be performed in a different order (as well as certain steps removed or added) without departing from the intent of the disclosure. As illustrated in FIGS. 1A and 1B, a device 110 local to a user 5, one or more servers 120, and one or more content source servers 125 may be connected across one or more networks 199.

As illustrated in FIG. 1A, the server(s) 120 is configured to cause speech processing data specific to frequently input commands to be stored by the device 110. The server(s) 120 determines (130) a unique identifier (ID) associated with one or more users. The server(s) 120 may include one or more customer profiles. Each customer profile may be associated with a different customer ID. A customer profile may be an umbrella profile specific to a group of users. That is, a customer profile encompasses two or more individual user profiles, each associated with a unique respective user ID. For example, a customer profile may be a household profile that encompasses user profiles associated with multiple users of a single household. A customer profile may include preferences shared by all of the user profiles encompassed thereby. A user profile may be a stand-alone profile or may be encompassed under a customer profile.

The server(s) 120 also determines (132) a spoken command history associated with the unique ID. If the unique ID corresponds to a single user profile, the spoken command may correspond to only spoken commands input to the system by the user associated with the profile. If the unique ID corresponds to a customer profile encompassing multiple user profiles, the spoken command history may correspond to commands input to the system by one or more of the users associated with the user profiles encompassed by the customer profile.

The server(s) 120 determines (134) the most frequently input command(s) represented in the usage history. The determined most frequently input command(s) may correspond to one or more commands satisfying a threshold frequency. The threshold frequency may correspond to a number of times a given command is input to the system in a given amount of time. The most frequently input command(s) may alternatively correspond to one or more commands satisfying a threshold percentage. The threshold percentage of a given command may be determined by determining a total number of inputs corresponding to commands received by the system over a period of time, determining the number of inputs corresponding to the given command, dividing the number of inputs by the total number of inputs, and multiplying the quotient by one hundred (100).

The server(s) 120 generates (136) speech processing data specific to the determined most frequently input command(s). The speech processing data may include data used to perform speech recognition processing (such as ASR, NLU and/or TTS) with respect to the determined most frequently input command(s). The speech processing data may also include data used to perform natural language processing with respect to text data output by the speech recognition processing of the determined most frequently input command(s).

The server(s) 120 sends (138) the speech processing data to one or more devices associated with the unique ID. The one or more devices store the speech processing data for use with respect to subsequently input commands.

The server(s) 120 may perform the aforementioned steps with respect to various unique IDs of the system. Moreover, the server(s) 120 may perform the aforementioned steps with respect to a single unique ID more than once, thereby ensuring that the speech processing data stored by the local device(s) corresponds to a current spoken command history associated with the unique ID. That is, the server(s) 120 may cause the speech processing data stored by a local device to be updated to delete speech processing data associated with commands that are no longer determine "most frequently input" as well as add speech processing data associated with commands that were determined "most frequently input" after the previous speech processing data was previously sent to and stored by the local device.

Prior to the user purchasing or otherwise obtaining the device 110, the device 110 may be configured with speech processing data specific to most frequently used commands as determined across multiple users of the system.

As illustrated in FIG. 1B, the device 110 is configured to process certain commands locally, without involving (or limiting the involvement of) the server(s) 120. A user 5 may speak a command (represented as audio 11). The device 110 including a microphone (or array of microphones) receives (140) the audio 11 and generates (142) input audio data corresponding to the audio 11. The device 110 performs (144), using speech recognition data included in the speech processing data previously received from the server(s) 120 and stored by the device 110, speech recognition processing on the input audio data to generate input text data.

If the speech processing data did not include natural language processing data, the device 110 sends (146) the input text data to the server(s) 120. The server(s) 120 performs natural language processing of on the input text data to determine the command. The server(s) 120 also determines content responsive to the command. The server(s) 120 may determine the content in a first party (1P) storage (e.g., one operated and/or maintained by the server(s) 120). Alternatively, the server(s) 120 may receive the content from a third party (3P) source (e.g., one not operated or maintained, but in communication with, the server(s) 120), such as the content source server(s) 125. The server(s) 120 then sends output audio data corresponding to the content data to the device 110.

The device 110 receives (148) the output audio data from the server(s) 120. The device 110 then outputs (150) output audio corresponding to the output audio data.

If the speech processing data included natural language processing data, the device 110 may not send the input text data to the server(s) 120. Instead, the device 110 may locally perform natural language processing on the input text data to determine the command, determine output audio data based on the command, and output (150) audio corresponding to the output audio data.

The system may operate using various components as described in FIG. 2. The various components illustrated FIG.

2 may be located on a same or different physical devices. Communication between various components illustrated in FIG. 2 may occur directly or across a network(s) 199.

The device 110 captures input audio 11, corresponding to a spoken utterance, using an audio capture component, such as a microphone or array of microphones. The device 110, using a wakeword detection component 220, processes audio data corresponding to the input audio 11 to determine if a keyword (e.g., a wakeword) is detected in the audio data. Following detection of a wakeword, the device 110 sends audio data 211, corresponding to the utterance, to the server(s) 120.

Upon receipt by the server(s) 120, the audio data 211 may be sent to an orchestrator component 230. The orchestrator component 230 may include memory and logic that enables the orchestrator component 230 to transmit various pieces and forms of data to various components of the system.

The orchestrator component 230 sends the audio data 211 to a speech processing component 240. A speech recognition component 250 of the speech processing component 240 transcribes the audio data 211 into one more textual interpretations representing speech contained in the audio data 211. The speech recognition component 250 interprets the spoken utterance based on a similarity between the spoken utterance and pre-established language models. For example, the speech recognition component 250 may compare the audio data 211 with models for sounds (e.g., subword units or phonemes) and sequences of sounds to identify words that match the sequence of sounds spoken in the utterance represented in the audio data 211. The speech recognition component 250 sends text data generated thereby to a natural language component 260 of the speech processing component 260. The text data sent from the speech recognition component 250 to the natural language component 260 may include a top scoring textual interpretation of the audio data 211 or may include an N-best list including a group of textual interpretations of the audio data 211 and potentially their respective scores.

The natural language component 260 attempts to make a semantic interpretation of the phrases or statements represented in the text data input therein. That is, the natural language component 260 determines one or more meanings associated with the phrases or statements represented in the text data based on individual words represented in the text data. The natural language component 260 interprets a text string to derive an intent of the user command represented in the text data (e.g., an action that the user desires be performed) as well as pertinent pieces of information in the text data that allow a device (e.g., the device 110, the server(s) 120, the content source server(s) 125, etc.) to complete the intent. For example, if the text data corresponds to "call mom," the natural language component 260 may determine the user intended to activate a telephone in his/her device and to initiate a call with a contact matching the entity "mom."

The server(s) 120 may include a user recognition component 295. The user recognition component 295 may take as input the audio data 211 and/or the text data output by the speech recognition component 250. The user recognition component 295 determines scores indicating whether the command originated from particular users. For example, a first score may indicate a likelihood that the command originated from a first user, a second score may indicate a likelihood that the command originated from a second user, etc. The user recognition component 295 also determines an overall confidence regarding the accuracy of user recognition operations. The user recognition component 295 may perform user recognition by comparing speech characteristics in the audio data 211 to stored speech characteristics of users. The user recognition component 295 may also perform user recognition by comparing biometric data (e.g., fingerprint data, iris data, etc.) received by the system in correlation with the present command to stored biometric data of users. The user recognition component 295 may further perform user recognition by comparing image data (e.g., including a representation of at least a feature of a user) received by the system in correlation with the present command with stored image data (e.g., including representations of features of users). The user recognition component 295 may perform additional user recognition processes, including those known in the art. Output of the user recognition component 295 may be used to inform natural language component 260 processes as well as processing performed by applications 290.

The server(s) 120 may include a user profile storage 270. The user profile storage 270 may include a variety of information related to individual users, groups of users, etc. that interact with the system. The user profile storage 270 may include one or more customer profiles. Each customer profile may be associated with a different customer identifier (ID). A customer profile may be an umbrella profile specific to a group of users. That is, a customer profile encompasses two or more individual user profiles, each associated with a unique respective user ID. For example, a customer profile may be a household profile that encompasses user profiles associated with multiple users of a single household. A customer profile may include preferences shared by all of the user profiles encompassed thereby. Each user profile encompassed under a single customer profile may include preferences specific to the user associated therewith. That is, each user profile may include preferences unique with respect to one or more other user profiles encompassed by the same customer profile. A user profile may be a stand-alone profile or may be encompassed under a customer profile. As illustrated, the user profile storage 270 is implemented as part of the server(s) 120. However, it should be appreciated that the user profile storage 270 may be located proximate to the server(s) 120, or may otherwise be in communication with the server(s) 120, for example over the network(s) 199.

The orchestrator component 230 may send output from the natural language component 260 (e.g., text data including tags attributing meaning to the words and phrases represented in the text data), and optionally output from the user recognition component 295 and/or data from the user profile storage 270, to one or more applications 290. FIG. 2 illustrates various applications 290 executed by the server(s). However, it should be appreciated that the orchestrator component 230 may additionally or alternatively send output from the natural language component 260 to one or more content source servers 125 executing applications that may thereby cause the content source server(s) 125 to provide the server(s) 120 with content responsive to the command.

An "application," as used herein, may be considered synonymous with a skill. A "skill" may be software running on the server(s) 120 that is akin to an application. That is, a skill may enable the server(s) 120 or other remote device to execute specific functionality in order to provide data or produce some other output requested by a user. The system may be configured with more than one skill. A skill may either be executed by the server(s) 120 or merely associated with the server(s) 120 (i.e., one executed by a different remote device such as a content source server 125). For example, a weather service skill may enable the server(s)

120 to execute a command with respect to a weather service server(s), a car service skill may enable the server(s) 120 to execute a command with respect to a taxi or ride sharing service server(s), an order pizza skill may enable the server(s) 120 to execute a command with respect to a restaurant server(s), etc.

The orchestrator component 230 may choose which application 290 to send data to based on the output of the natural language component 260. In an example, the orchestrator component 230 may send data to a music playing application when the natural language component 260 outputs text data associated with a command to play music. In another example, the orchestrator component 230 may send data to a weather application when the natural language component 260 outputs text data associated with a command to output weather information. In yet another example, the orchestrator component 230 may send data to a search engine application when the natural language component 260 outputs text data associated with a command to obtain search results.

An application 290 may output text data, which the orchestrator component 230 may send to a text-to-speech component 280. The text-to-speech component 280 may synthesize speech corresponding to the text data input therein. The server(s) 120 may send audio data synthesized by the text-to-speech component 280 to the device 110 (or another device including a speaker and associated with the same user ID or customer ID) for output to the user.

The text-to-speech component 280 may perform speech synthesis using one or more different methods. In one method of synthesis called unit selection, the text-to-speech component 280 matches text data against a database of recorded speech. Matching units are selected and concatenated together to form audio data. In another method of synthesis called parametric synthesis, the text-to-speech component 280 varies parameters such as frequency, volume, and noise to create an artificial speech waveform output. Parametric synthesis uses a computerized voice generator, sometimes called a vocoder.

The server(s) 120 may additionally include a speech processing model generator component 285. The speech processing model generator component 285 may perform all or some of the steps illustrated in and described with respect to FIG. 1A.

FIG. 3 illustrates how speech recognition processing is performed on audio data. The speech recognition component 250 interprets audio data input thereto based on a similarity between the audio represented in the audio data and pre-established language models 354 stored in a speech recognition model storage 352. For example, the speech recognition component 250 may compare the audio data 211 with models for sounds (e.g., subword units or phonemes) and sequences of sounds to identify words that match the sequence of sounds spoken in the utterance represented in the audio data 211.

The different ways an utterance may be interpreted (i.e., the different hypotheses) may each be assigned a probability or a confidence score representing a likelihood that a particular set of words matches those spoken in the utterance. The confidence score may be based on a number of factors including, for example, a similarity of the sound in the utterance to models for language sounds (e.g., an acoustic model 353 stored in the speech recognition models storage 352), and a likelihood that a particular word that matches the sound would be included in the sentence at the specific location (e.g., using a language model 354 stored in the speech recognition models storage 352). Thus, each potential textual interpretation of the utterance (i.e., hypothesis) is associated with a confidence score. Based on the considered factors and the assigned confidence score, the speech recognition component 250 may output text data corresponding to the textual interpretation most likely corresponding to the audio data 211. The speech recognition component 250 may also output multiple hypotheses in the form of a lattice or an N-best list with each hypothesis corresponding to a confidence score or other score (e.g., such as probability scores, etc.).

The device(s) including the speech recognition component 250 may include an acoustic front end (AFE) 356 and a speech recognition engine 358. The AFE 356 transforms the audio data 211 into data that may be processed by the speech recognition engine 358. The speech recognition engine 358 compares the data input therein with acoustic models 353, language models 354, and other data models and information for recognizing the speech represented in the audio data 211. The AFE 356 may reduce noise in the audio data 211 as well as divide the digitized audio data 211 into frames representing time intervals for which the AFE 356 determines a number of values (i.e., features) representing qualities of the audio data 311, along with a set of those values (i.e., a feature vector or audio feature vector) representing features/qualities of the audio data 311 within each frame. Many different features may be determined, as known in the art, and each feature represents some quality of the speech represented in the audio data 211 that may be useful for speech recognition processing. A number of approaches may be used by the AFE 356 to process the audio data 211, such as mel-frequency cepstral coefficients (MFCCs), perceptual linear predictive (PLP) techniques, neural network feature vector techniques, linear discriminant analysis, semi-tied covariance matrices, or other approaches known to those skilled in the art.

The speech recognition engine 358 may process data output from the AFE 356 with reference to information stored in the speech recognition models storage 352. Alternatively, the speech recognition engine 358 may receive post-AFE processed data (e.g., feature vectors) from a source other than the speech recognition component 250 internal AFE 356. For example, the device 110 may process the audio data 211 into feature vectors (e.g., using an on-device AFE) and transmit that information to the server(s) 120 across the network(s) 199. Such feature vectors may arrive at the server(s) 120 encoded, in which case the speech recognition engine 358 (or another component of the server(s) 120) may decode the encoded feature vectors prior to speech recognition processing being performed by the speech recognition engine 358.

The speech recognition engine 358 attempts to match received feature vectors to language phonemes and words as known in the acoustic models 353 and language models 354. The speech recognition engine 358 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving a likelihood that the speech recognition component 250 will output text data including text that makes sense grammatically.

The speech recognition engine 358 may use a number of techniques to match feature vectors to phonemes. For example, the speech recognition engine 358 may use Hidden Markov Models (HMIMs) to determine probabilities that feature vectors may match phonemes. Sounds received may be represented as paths between states of the HMM and multiple paths may represent multiple possible text matches for the same sound.

The speech recognition component 250, namely the speech recognition engine 358, may output a single textual interpretation of the speech represented in the audio data 211 or an N-best list including multiple textual interpretations of the speech represented in the audio data 211. Each textual interpretation in the N-best list may be associated with a respective score (e.g., a probability score) indicating a confidence that the respective textual interpretation corresponds to the speech represented in the audio data 211.

Figure 4:
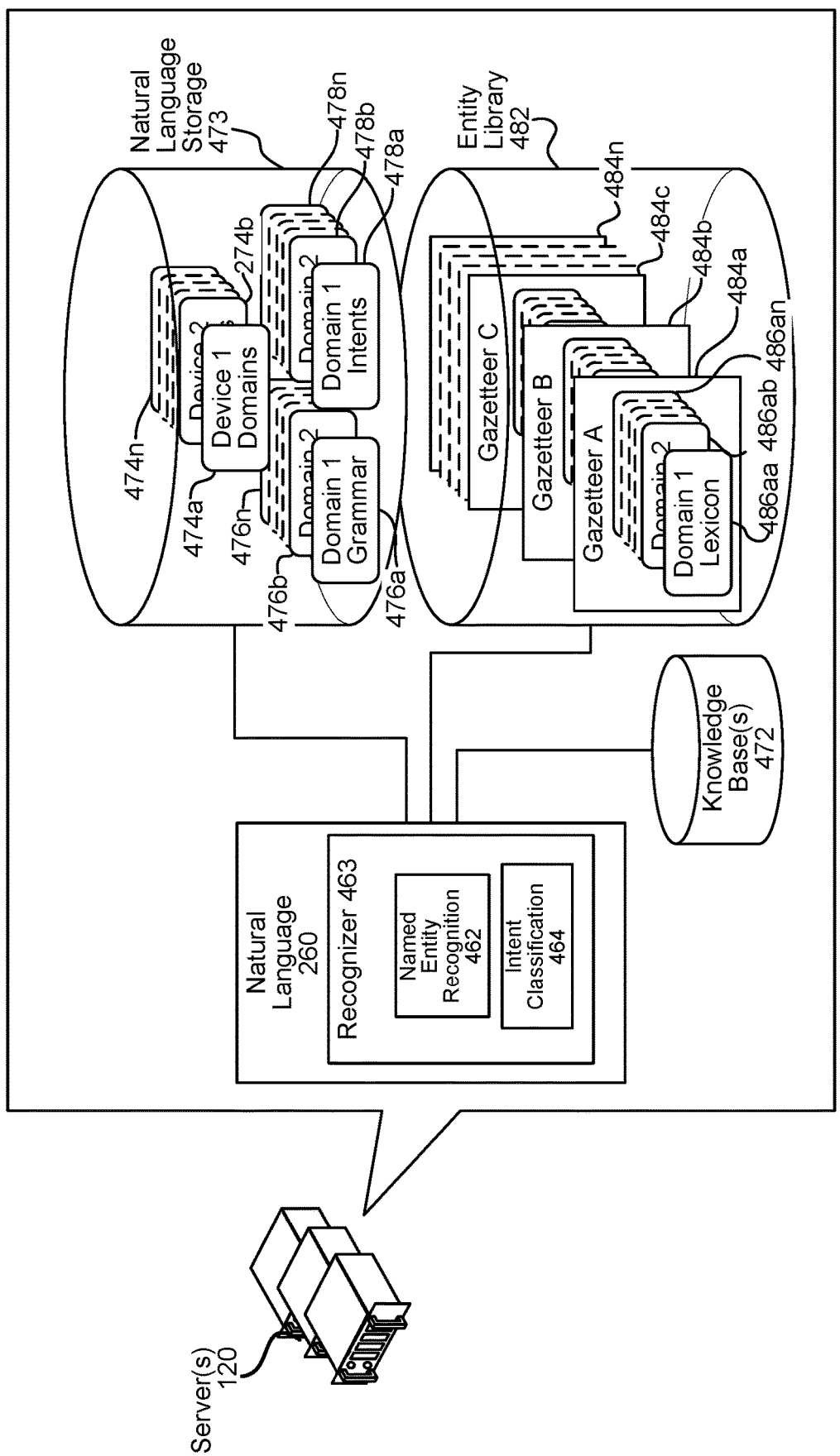
FIG. 4 is a conceptual diagram of how natural language processing is performed according to embodiments of the present disclosure.

FIG. 4 illustrates how natural language processing is performed on audio data.

Generally, the natural language component 260 attempts to make a semantic interpretation of text represented in text data (e.g., output by the speech recognition component 250). That is, the natural language component 260 determines the meaning behind the text represented in text data based on the individual words. The natural language component 260 interprets text to derive an intent or a desired action from the user as well as the pertinent pieces of information in the text that allow a device (e.g., device 110) to complete that action. For example, if the natural language component 260 receives text data including text corresponding to "call mom," the natural language component 260 may determine that the user intended to activate a telephone in his/her device and to initiate a call with a contact matching the entity "mom."

The natural language component 260 may process text data including several textual interpretations of a single utterance. For example, if the speech recognition component 250 outputs text data including an N-best list of textual interpretations, the natural language component 260 may process the text data with respect to all (or a portion of) the textual interpretations represented therein.

The natural language component 260 may annotate text represented in text data by parsing and/or tagging the text. For example, for the text "call mom," the natural language component 260 may tag "call" as a command (e.g., to execute a phone call) as well as tag "mom" as an entity and target of the command. For the foregoing example, the natural language component 260 may annotate the text with a telephone number for the entity corresponding to "mom" stored in a contact list.

The natural language component 260 may include one or more recognizers 463. Each recognizer 463 may be associated with a different "domain." A domain may correspond to a common group of information or activities, such as weather, music, video, communications, shopping, etc. Moreover, a recognizer 463 may be associated with a content source server 125. The natural language component 260 may determine a domain potentially associated with a textual interpretation represented in text data input thereto in order to determine the proper recognizer 463 to process the textual interpretation. The natural language component 260 may determine a single textual interpretation is potentially associated with more than one domain.

Multiple recognizers 463 may be functionally linked (e.g., a telephony/communications recognizer and a calendaring recognizer may utilize data from the same contact list).

If the natural language component 260 determines a specific textual interpretation is potentially associated with multiple domains, the recognizers 463 associated with the domains may process the specific textual interpretation in parallel. For example, if a specific textual interpretation potentially implicates both a communications domain and a music domain, a recognizer associated with the communications domain may process the textual interpretation in parallel, or substantially in parallel, with a recognizer associated with the music domain processing the textual interpretation. The output generated by each recognizer 463 may be scored, with the overall highest scored output from all recognizers ordinarily being selected to be the correct result.

The natural language component 260 may communicate with various storages to determine the potential domain(s) associated with a textual interpretation. The natural language component 260 may communicate with the natural language storage 473, which includes a databases of devices (474a-474n) identifying domains associated with specific devices. For example, the device 110 may be associated with domains for music, calendaring, contact lists, device-specific communications, etc. In addition, the natural language component 260 may communicate with the entity library 482, which includes database entries about specific services on a specific device, either indexed by Device ID, Speaker ID, or Household ID, or some other indicator.

Each recognizer 463 may include a named entity recognition (NER) component 462. The NER component 462 attempts to identify grammars and lexical information that may be used to construe meaning with respect to a textual interpretation input therein. The NER component 462 identifies portions of text represented in text data input into the natural language component 260 that correspond to a named entity that may be recognizable by the system. The NER component 462 (or other component of the natural language component 260) may also determine whether a word refers to an entity that is not explicitly mentioned in the utterance text, for example "him," "her," "it" or other anaphora, exophora or the like.

Each recognizer 463, and more specifically each NER component 462, may be associated with a particular grammar model and/or database 476, a particular set of intents/actions 478, and a particular personalized lexicon 486. Each gazetteer 284 may include domain-indexed lexical information associated with a particular user and/or device. For example, the Gazetteer A (284a) includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

An NER component 462 applies grammar models 476 and lexical information 486 associated with the domain (associated with the recognizer 463 implementing the NER component 462) to determine a mention one or more entities in the a textual interpretation input therein. In this manner, the NER component 462 identifies "slots" (i.e., particular words in a textual interpretation) that may be needed for later command processing. The NER component 462 may also label each slot with a type of varying levels of specificity (e.g., noun, place, city, artist name, song name, etc.).

Each grammar model 476 includes the names of entities (i.e., nouns) commonly found in speech about the particular domain (i.e., generic terms) to which the grammar model 476 relates, whereas the lexical information 486 is personalized to the user(s) and/or the device from which the audio data 211 originated. For example, a grammar model 476 associated with a shopping domain may include a database of words commonly used when people discuss shopping.

A downstream process called named entity resolution actually links a portion of text to an actual specific entity known to the system. To perform named entity resolution, the natural language component 260 may utilize gazetteer information (484*a*-484*n*) stored in an entity library storage 482. The gazetteer information 484 may be used to match text represented in text data output by the speech recognition component 250 with different entities, such as song titles, contact names, etc. Gazetteers may be linked to users (e.g., a particular gazetteer may be associated with a specific user's music collection), may be linked to certain domains (e.g., shopping, music, video, communications, etc.), or may be organized in a variety of other ways.

Each recognizer 463 may also include an intent classification (IC) component 464. The IC component 464 parses an input textual interpretation to determine an intent(s) of the domain associated with the recognizer 463 that potentially corresponds to the textual interpretation. An intent corresponds to an action to be performed that is responsive to the command represented by the textual interpretation. The IC component 464 may communicate with a database 278 of words linked to intents. For example, a music intent database may link words and phrases such as "quiet," "volume off," and "mute" to a "mute" intent. The IC component 464 identifies potential intents by comparing words in the textual interpretation to the words and phrases in an intents database 278 associated with the domain that is associated with the recognizer 463 implementing the IC component 464.

The intents identifiable by a specific IC component 464 are linked to domain-specific (i.e., the domain associated with the recognizer 463 implementing the IC component 464) grammar frameworks 476 with "slots" to be filled. Each slot of a grammar framework 476 corresponds to a portion of the text interpretation that the system believes corresponds to an entity. For example, a grammar framework 476 corresponding to a <PlayMusic> intent may correspond to textual interpretation sentence structures such as "Play {Artist Name}," "Play {Album Name}," "Play {Song name}," "Play {Song name} by {Artist Name}," etc. However, to make resolution more flexible, grammar frameworks 476 may not be structured as sentences, but rather based on associating slots with grammatical tags.

For example, an NER component 462 may parse a textual interpretation to identify words as subject, object, verb, preposition, etc. based on grammar rules and/or models prior to recognizing named entities in the textual interpretation. An IC component 464 (implemented by the same recognizer 463 as the NER component 462) may use the identified verb to identify an intent. The NER component 462 may then determine a grammar model 476 associated with the identified intent. For example, a grammar model 476 for an intent corresponding to <PlayMusic> may specify a list of slots applicable to play the identified "object" and any object modifier (e.g., a prepositional phrase), such as {Artist Name}, {Album Name}, {Song name}, etc. The NER component 462 may then search corresponding fields in a lexicon 486 associated with the domain associated with the recognizer 463 implementing the NER component 462, attempting to match words and phrases in the textual interpretation the NER component 462 previously tagged as a grammatical object or object modifier with those identified in the lexicon 486.

An NER component 462 may perform semantic tagging, which is the labeling of a word or combination of words according to their type/semantic meaning. An NER component 462 may parse a textual interpretation heuristic grammar rules, or a model may be constructed using techniques such as hidden Markov models, maximum entropy models, log linear models, conditional random fields (CRF), and the like. For example, an NER component 462 implemented by a music domain recognizer 463 may parse and tag a textual interpretation corresponding to "play mother's little helper by the rolling stones" as {Verb}: "Play," {Object}: "mother's little helper," {Object Preposition}: "by," and {Object Modifier}: "the rolling stones." The NER component 462 identifies "Play" as a verb based on a word database associated with the music domain, which an IC component 464 (also implemented by the music domain recognizer 463) may determine corresponds to a <PlayMusic> intent. At this stage, no determination has been made as to the meaning of "mother's little helper" and "the rolling stones," but based on grammar rules and models, the NER component 462 has determined that the text of these phrases relates to the grammatical object (i.e., entity) of the textual interpretation.

The frameworks linked to the intent are then used to determine what database fields should be searched to determine the meaning of these phrases, such as searching a user's gazetteer 484 for similarity with the framework slots. For example, a framework for a <PlayMusic> intent might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 484 does not resolve the a slot/field using gazetteer information, the NER component 462 may search the database of generic words associated with the domain (in the knowledge base 472). For example, if the textual interpretation was "play songs by the rolling stones," after failing to determine an album name or song name called "songs" by "the rolling stones," the NER component 462 may search the domain vocabulary for the word "songs." In the alternative, generic words may be checked before the gazetteer information, or both may be tried, potentially producing two different results.

The natural language component 260 may tag the textual interpretation to attribute meaning to the textual interpretation. For example, the natural language component 260 may tag "play mother's little helper by the rolling stones" as: {domain} Music, {intent} Play Music, {artist name} rolling stones, {media type} SONG, and {song title} mother's little helper. For further example, the natural language component 260 may tag "play songs by the rolling stones" as: {domain} Music, {intent} Play Music, {artist name} rolling stones, and {media type} SONG.

Figure 5:
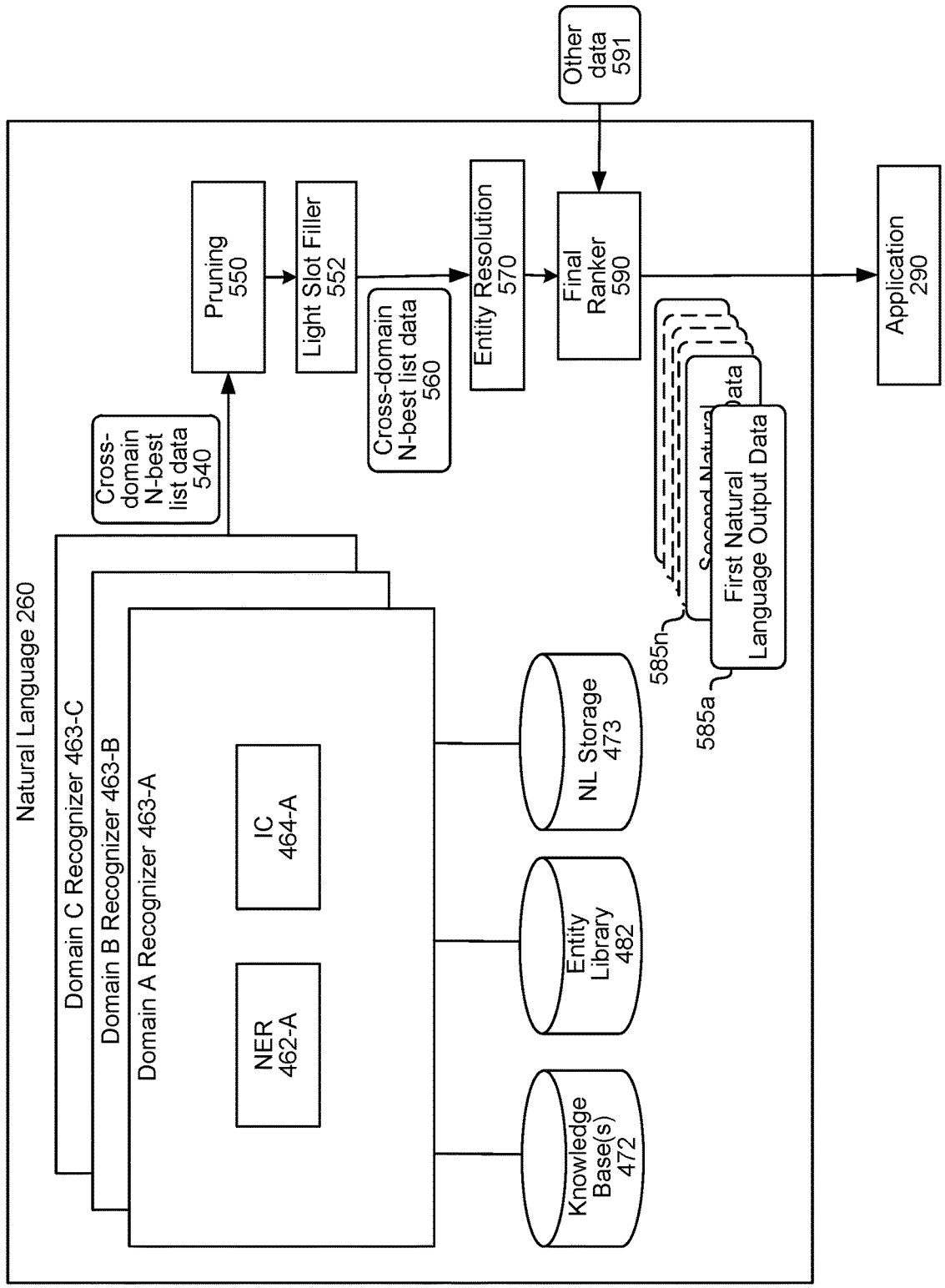
FIG. 5 is a conceptual diagram of how natural language processing is performed according to embodiments of the present disclosure.

Each recognizer 463 may output data corresponding to a single textual interpretation or to an N-best list of textual interpretations. The textual interpretations may rely on various data discussed above in knowledge base 472, storage 473, library 482, or otherwise. The natural language component 260 may compile the output data of the recognizers 463 into a single cross-domain N-best list, and may send cross-domain N-best list data 540 (representing the cross-domain N-best list) to a pruning component 550 (as illustrated in FIG. 5). The tagged textual interpretations in the cross-domain N-best list data 540 may each be associated with a respect score indicating the tagged textual interpretation corresponds to the domain associated with the recognizer 463 from which the tagged textual interpretation was output. For example, the cross-domain N-best list data 540 may be represented as:

[0.95] Intent: <PlayMusic> ArtistName: Lady Gaga SongName: Poker Face

[0.70] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface

The pruning component 550 creates a new, shorter N-best list (i.e., represented in cross-domain N-best list data 560 discussed below) based on the cross-domain N-best list data 540. The pruning component 550 may sort the tagged textual interpretations represented in the cross-domain N-best list data 540 according to their respective scores.

The pruning component 550 may perform score thresholding with respect to the cross-domain N-best list data 540. For example, the pruning component 550 may select textual interpretations represented in the cross-domain N-best list data 540 associated with a score satisfying (e.g., meeting and/or exceeding) a score threshold. The pruning component 550 may also or alternatively perform number of textual interpretation thresholding. For example, the pruning component 550 may select the top scoring textual interpretation(s) associated with each different domain represented in the cross-domain N-best list data 540, with the new cross-domain N-best list data 560 including a total number of textual interpretations meeting or falling below a threshold number of textual interpretations. The purpose of the pruning component 550 is to create a new list of top scoring textual interpretations so that downstream (more resource intensive) processes may only operate on the tagged textual interpretations that most likely correspond to the command input to the system.

The natural language component 260 may also include a light slot filler component 552. The light slot filler component 552 can take text from slots represented in the textual interpretation(s) output by the pruning component 550 and alter it to make the text more easily processed by downstream components. The operations of the light slot filler component 552 are typically low latency operations that do not involve heavy operations such as reference to a knowledge base. The purpose of the light slot filler component 552 is to replace words with other words or values that may be more easily understood by downstream components. For example, if a textual interpretation includes the word "tomorrow," the light slot filler component 552 may replace the word "tomorrow" with an actual date for purposes of downstream processing. Similarly, the light slot filler component 552 may replace the word "CD" with "album" or the words "compact disc." The replaced words are then included in the cross-domain N-best list data 560.

The natural language component 260 sends the cross-domain N-best list data 560 to an entity resolution component 570. The entity resolution component 570 can apply rules or other instructions to standardize labels or tokens from previous stages into an intent/slot representation. The precise transformation may depend on the domain (e.g., for a travel domain the entity resolution component 570 may transform a text mention of "Boston airport" to the standard BOS three-letter code referring to the airport). The entity resolution component 570 can refer to an authority source (e.g., a knowledge base) that is used to specifically identify the precise entity referred to in each slot of each textual interpretation represented in the cross-domain N-best list data 560. Specific intent/slot combinations may also be tied to a particular source, which may then be used to resolve the text. In the example "play songs by the stones," the entity resolution component 570 may reference a personal music catalog, Amazon Music account, user profile 702 (described herein below), or the like. The entity resolution component 570 may output data including an altered N-best list that is based on the cross-domain N-best list represented in the cross-domain N-best list data 560, but also includes more detailed information (e.g., entity IDs) about the specific entities mentioned in the slots and/or more detailed slot data that can eventually be used by an application 290 which may be incorporated into the server(s) 120 components or pipeline or may be on a separate device(s) (e.g., a content source server(s) 125) in communication with the server(s) 120. The natural language component 260 may include multiple entity resolution components 570 and each entity resolution component 570 may be specific to one or more domains.

The entity resolution component 570 may not be successful in resolving every entity and filling every slot represented in the N-best list represented in the cross-domain N-best list data 560. This may result in the entity resolution component 570 outputting incomplete results. The natural language component 260 may including a final ranker component 590, which may consider such errors when determining how to rank the tagged textual interpretations for potential execution. For example, if a book domain recognizer 463 outputs a tagged textual interpretation including a <ReadBook> intent flag, but the entity resolution component 570 cannot find a book with a title matching the text of the item, the final ranker component 590 may re-score that particular tagged textual interpretation to be given a lower score. The final ranker component 590 may also assign a particular confidence to each tagged textual interpretation input therein. The confidence score of a particular tagged textual interpretation may be affected by whether the tagged textual interpretation has unfilled slots. For example, if a tagged textual interpretation associated with a first domain includes slots that are all filled/resolved, that tagged textual interpretation may be associated with a higher confidence than another tagged textual interpretation including at least some slots that are unfilled/unresolved.

The final ranker component 590 may apply re-scoring, biasing, or other techniques to obtain the most preferred tagged and resolved textual interpretation. To do so, the final ranker component 590 may consider not only the data output by the entity resolution component 570, but may also consider other data 591. The other data 591 may include a variety of information. For example, the other data 591 may include application rating or popularity data. For example, if one application has a particularly high rating, the final ranker component 590 may increase the score of a textual interpretation(s) associated with or otherwise invoking that particular application. The other data 591 may also include information about applications that have been specifically enabled by the user. For example, the final ranker component 590 may assign higher scores to textual interpretations associated with or otherwise invoking enabled applications than textual interpretations associated with or otherwise invoking non-enabled applications. User history may also be considered, such as if the user regularly uses a particular supplemental application or does so at particular times of day. Date, time, location, weather, type of device 110, user ID, context, and other information may also be considered. For example, the final ranker component 590 may consider when any particular applications are currently active (e.g., music being played, a game being played, etc.).

Following final ranking, the natural language component 260 may output natural language output data 585. The natural language component 260 may be sent to the orchestrator component 230, which sends the natural language output data 585 to an appropriate application 290 (e.g., one configured to execute a command based on the textual interpretation represented in the natural language output data 585). The natural language output data 585 may include an indicator of the intent of the textual interpretation along with data associated with the intent, for example an indication that the intent is <PlayMusic> and the music to be played is "Adele." Multiple instances of natural language output data (e.g., 585*a*-585*n*) may be output for a given set of text data input into the natural language component 260.

The application(s) 290 provides the server(s) 120 with content responsive to the natural language output data 585 received thereby. If the content is text data that needs to be converted to speech, the orchestrator component 230 sends the content text data to the text-to-speech component 280.

Figure 6:
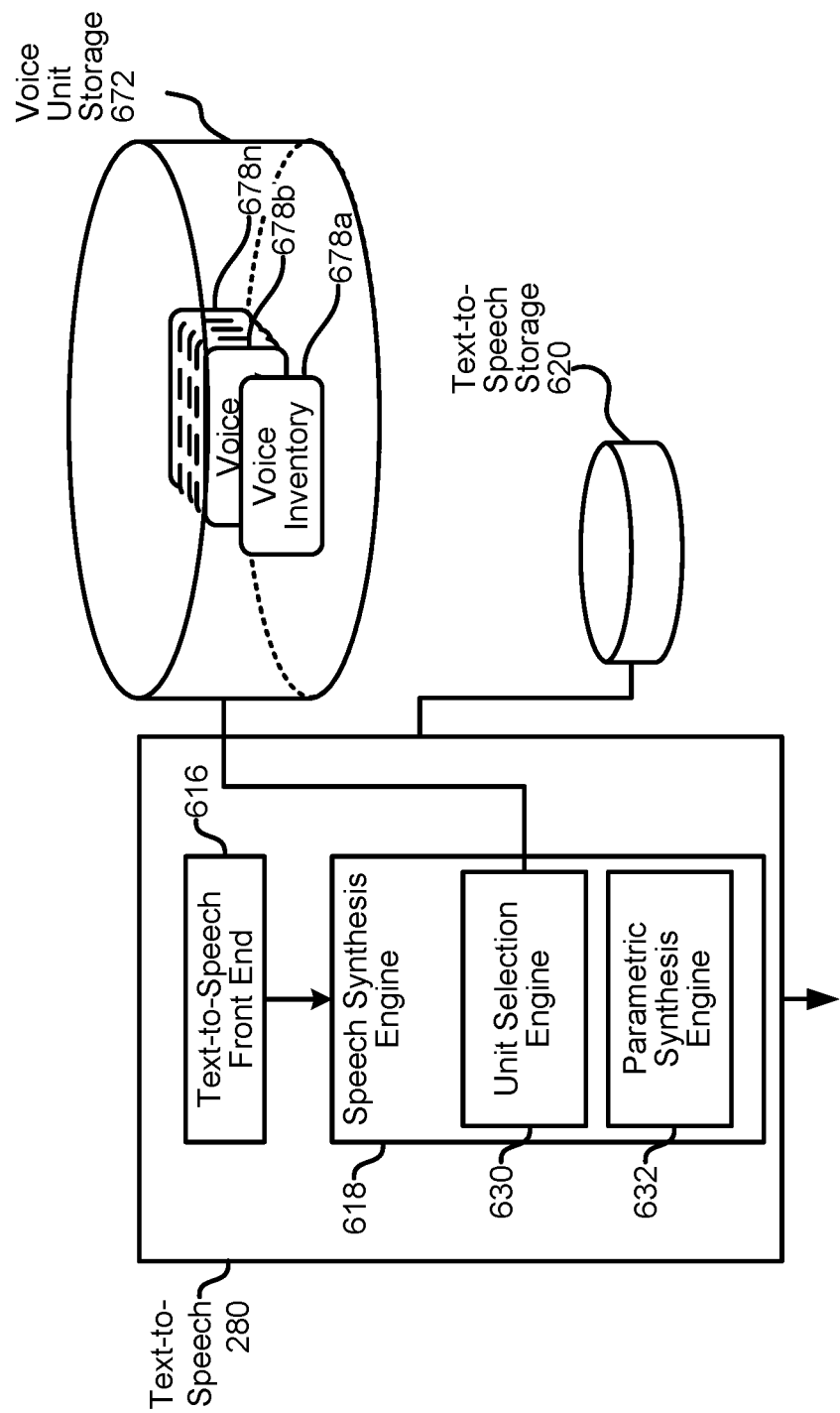
FIG. 6 is a conceptual diagram of how text-to-speech processing is performed according to embodiments of the present disclosure.

FIG. 6 illustrates how text-to-speech processing is performed on text data. The text-to-speech component 1580 may include a text-to-speech front end 616, a speech synthesis engine 618, and a text-to-speech storage 620. The text-to-speech front end 616 transforms input text data into a symbolic linguistic representation for processing by the speech synthesis engine 618. The text-to-speech front end 616 may also process tags or other data input to the text-to-speech component 280 that indicate how specific words should be pronounced. The speech synthesis engine 618 compares the annotated phonetic units and information stored in the text-to-speech storage 620 for converting input text data into speech (i.e., audio data). The text-to-speech front end 616 and the speech synthesis engine 618 may include their own controller(s)/processor(s) and memory, or they may use the controller/processor and memory of the server(s) 120, the device 110, or another device, for example. Similarly, the instructions for operating the text-to-speech front end 616 and the speech synthesis engine 618 may be located within the text-to-speech component 280, or within the memory and/or storage of the server(s) 120, the device 110, or within another device.

The text-to-speech front end 616 may perform text normalization, linguistic analysis, and linguistic prosody generation. During text normalization, the text-to-speech front end 616 processes generates normalized text data from input text data by converting such things as numbers, abbreviations (e.g., Apt., St., etc.), and symbols ($, %, etc.) into the equivalent of written out words.

During linguistic analysis the text-to-speech front end 616 analyzes language in the normalized text data to generate a sequence of phonetic units corresponding to the text data. This process may be referred to as phonetic transcription. Phonetic units include symbolic representations of sound units to be eventually combined and output by the system as speech. Various sound units may be used for dividing text data for purposes of speech synthesis. The text-to-speech component 280 may process text based on phonemes (i.e., individual sounds), half-phonemes, di-phones (i.e., the last half of one phoneme coupled with the first half of an adjacent phoneme), bi-phones (i.e., two consecutive phonemes), syllables, words, phrases, sentences, or other units. The text-to-speech component 280 may map each word to one or more phonetic units. The text-to-speech component 280 may perform such mapping using a language dictionary stored in, for example the text-to-speech storage 620. During linguistic analysis, the text-to-speech front end 616 may also identify different grammatical components such as prefixes, suffixes, phrases, punctuation, syntactic boundaries, or the like. The text-to-speech component 280 may use such grammatical components to craft a natural sounding audio waveform output. The language dictionary may also include letter-to-sound rules and other tools that may be used to pronounce previously unidentified words or letter combinations that may be encountered by the text-to-speech component 280. Generally, the more information included in the language dictionary, the higher quality of speech included in audio data output by the text-to-speech component 280.

Based on the linguistic analysis, the text-to-speech front end 616 may perform linguistic prosody generation where the phonetic units are annotated with desired prosodic characteristics, also called acoustic features, which indicate how the desired phonetic units are to be pronounced in the speech represented in the audio data output by the text-to-speech component 280. The text-to-speech front end 616 may consider and incorporate any prosodic annotations that accompanied the text data input to the text-to-speech component 280. Such acoustic features may include pitch, energy, duration, and the like. Acoustic features may be applied based on prosodic models available to the text-to-speech component 280. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, a prosodic model with more information may result in higher quality speech in audio data output by the text-to-speech component 280 than prosodic models with less information.

The text-to-speech front end 616 may output a symbolic linguistic representation including a sequence of phonetic units annotated with prosodic characteristics. The speech synthesis engine 618, also known as a synthesizer, receives the symbolic linguistic representation as input. The speech synthesis engine 618 converts the symbolic linguistic representation into an audio waveform of speech for output to an audio output device and eventually to a user. The speech synthesis engine 618 may convert the text data corresponding to symbolic linguistic representation into high-quality natural-sounding speech (i.e., audio data). The speech synthesis engine 618 may create the high-quality speech to sound as much like a human speaker as possible, or may create the high-quality speech to simply be understandable to by a user without attempts to mimic a precise human voice.

The speech synthesis engine 618 may perform speech synthesis using one or more different methods. In one method of synthesis called unit selection, a unit selection engine 630 matches the symbolic linguistic representation created by the text-to-speech front end 616 against a database of recorded speech, such as a database of a voice corpus. The unit selection engine 630 matches the symbolic linguistic representation against spoken audio units in the database. Matching units are selected and concatenated together to form audio data corresponding to a speech output. Each unit includes an audio waveform corresponding with a phonetic unit, such as a short .wav file of the specific sound, along with a description of the various acoustic features associated with the .wav file (e.g., its pitch, energy, etc.), as well as other information, such as where the phonetic unit appears in a word, sentence, or phrase, neighboring phonetic units, etc. Using all the information in the unit database, the unit selection engine 630 may match units to the input text data to create a natural sounding waveform. The unit database may include multiple examples of phonetic units to provide the system with many different options for concatenating units into speech. One benefit of unit selection is that, depending on the size of the database, a natural sounding speech output may be generated. The larger the unit database of the voice corpus, the more likely the system will be able to construct natural sounding speech.

In another method of synthesis, called parametric synthesis, the parametric synthesis engine 632 varies parameters such as frequency, volume, and noise to create audio data including an artificial speech waveform. Parametric synthesis uses a computerized voice generator, sometimes called a vocoder. The parametric synthesis engine 632 may use an acoustic model and various statistical techniques to match a symbolic linguistic representation with desired output speech parameters. The parametric synthesis engine 632 may be accurate at high processing speeds, as well as capable of generating computerized speech without large databases associated with unit selection. However, the parametric synthesis engine may produce audio data including computerized speech of a quality lower than that output by the unit selection engine 630. The unit selection engine 630 and the parametric synthesis engine 632 may operate individually or together to produce audio data including a single speech output.

The text-to-speech component 280 may include an acoustic model(s), or other models, which may convert a symbolic linguistic representation into a synthetic acoustic waveform based on audio signal manipulation. The parametric synthesis engine 632 may uses rules included in the acoustic model(s) to assign specific audio waveform parameters to input phonetic units and/or prosodic annotations. The parametric synthesis engine 632 may use the rules to calculate a score representing a likelihood that a particular audio output parameter(s) (e.g., frequency, volume, etc.) corresponds to the portion of the input symbolic linguistic representation output by the text-to-speech front end 616.

The parametric synthesis engine 632 may use a number of techniques to match speech to be synthesized with input phonetic units and/or prosodic annotations. One technique involves using HMMs. The parametric synthesis engine 632 may use HMMs to determine probabilities that audio output should match textual input. The parametric synthesis engine 632 may use HMMs to translate from parameters in the linguistic and acoustic space to parameters to be used by a vocoder (i.e., the digital voice encoder) to artificially synthesize desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text data. Each portion of text data may be represented by multiple potential states corresponding to different known pronunciations of phonemes and their parts (e.g., phoneme identity, stress, accent, position, etc.). The parametric synthesis engine 632 may make an initial determination of a probability of a potential phoneme to be associated with one state. The parametric synthesis engine 632 may change the state or keep the state the same as the parametric synthesis engine 632 processes new text data. For example, the pronunciation of a previously processed word might change based on later processed words. The parametric synthesis engine 632 may use a Viterbi algorithm to find the most likely sequence of states based on the processed text data. The parametric synthesis engine 632 may use HMMs to generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, harmonic plus noise (HNM) based vocoders, code-excited linear prediction (CELP) vocoders, GlottHMM vocoders, harmonic/stochastic model (HSM) vocoders, or others.

To create a customized speech output, the text-to-speech component 280 may include multiple voice inventories 678 stored in a voice unit storage 672. Each voice inventory 678 is configured with a different "voice." Such voice inventories 672 may also be linked to user accounts. For example, the text-to-speech component 280 may use one voice inventory 678 to synthesize whispered speech (or speech approximating whispered speech), another voice inventory 678 to synthesize excited speech (or speech approximating excited speech), etc. To create the different voice inventories, a user of the system may speak a multitude of text-to-speech training utterances, which are recorded by the system. The text-to-speech training utterances used to train a text-to-speech voice corpus may be different from the training utterances used to train a speech recognition system. The text-to-speech component 280 may split audio data associated with the text-to-speech training utterances into small audio data segments and store them as part of a voice corpus. The user speaking the text-to-speech training utterances may speak in different voice qualities to create the customized voice inventories 678, for example the user may whisper the training utterances, say them in an excited voice, etc. Thus, the audio data of each voice inventory 678 may match a desired speech quality. The unit selection engine 630 may use the voice inventories 678 at runtime to generate audio data including synthesized speech.

As an alternative to customized voice inventories or customized parametric voices, the text-to-speech component 280 may use one or more filters to alter traditional text-to-speech output to match a desired speech quality (e.g., whisper, shout, etc.). For example, the text-to-speech component 280 may synthesize speech as normal, but the system, either as part of the text-to-speech component 280 or otherwise, may apply a filter to make the synthesized speech take on the desired speech quality.

During runtime, the text-to-speech component 280 may receive text data for speech synthesis along with an indicator for a desired speech quality of output speech. The text-to-speech component 280 may select a voice matching the speech quality, either for unit selection or parametric synthesis, and synthesize speech using the text data and the speech quality indicator.

Figure 7:
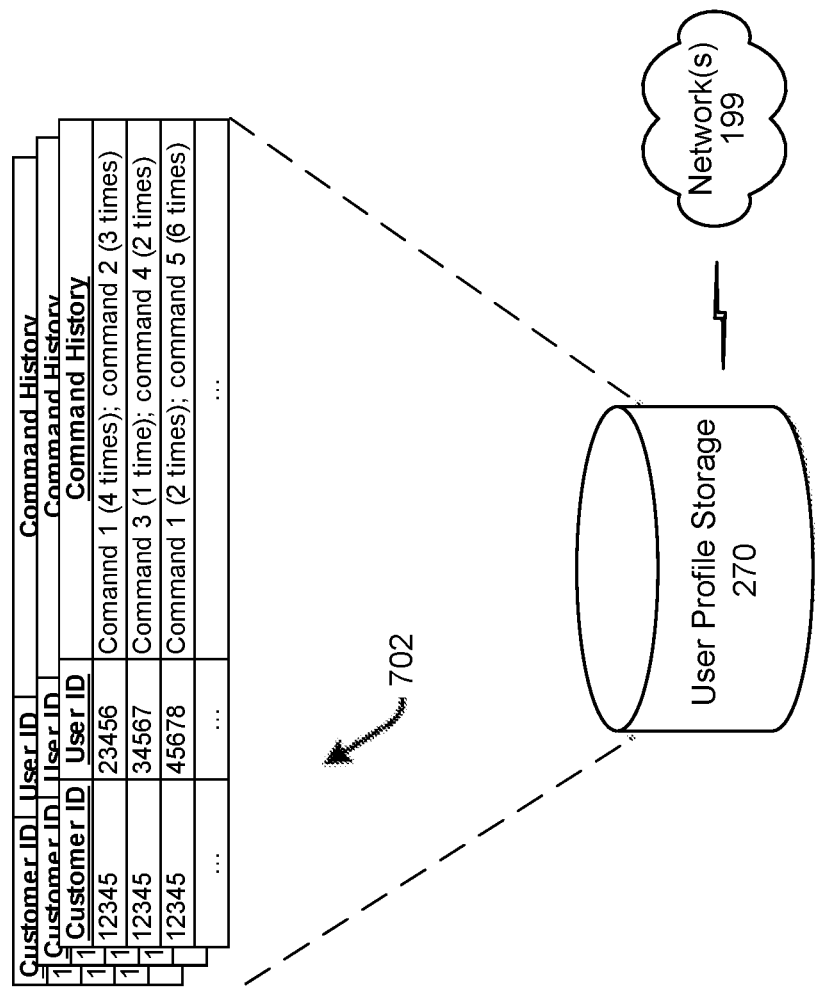
FIG. 7 illustrates data stored and associated with user profiles according to embodiments of the present disclosure.

FIG. 7 illustrates the user profile storage 270 that includes data regarding customer profiles as well as individual user profiles 702. For illustration, as shown in FIG. 7, each user profile 702 may include information indicating a history of commands input to the system. The user profile 702 may also include a variety of other information including information about different voices associated with the user profile (which may in turn be used by user recognition component 295), information about other voices detected for a local device but not necessarily yet associated with the user profile, information about what utterances were processed unsuccessfully by local device(s) (which may in turn be used to determine what data/capabilities should be provided to the local device(s)), information about what utterances were successfully processed by the local device(s), command sequences associated with users of the profile, or the like. Each user profile 702 may additionally include other data.

Figure 8A:
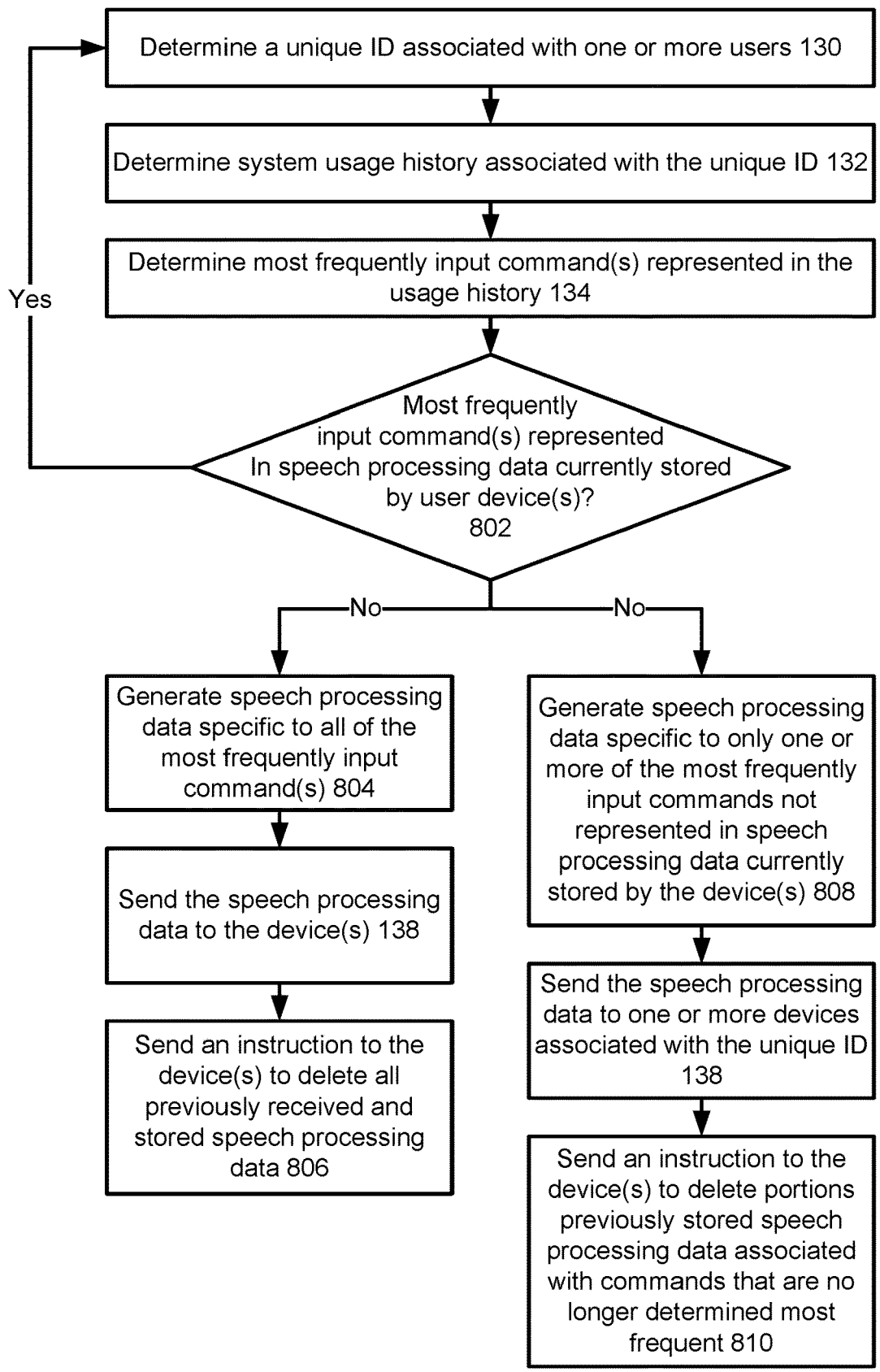
FIG. 8A is a process flow diagram illustrating a method for ensuring speech processing data stored on a local device is up-to-date according to embodiments of the present disclosure.

As detailed above, one or more devices local to users may be configured with speech processing data (e.g., speech recognition data, natural language data, and text-to-speech data) that enables the devices to locally process commands most frequently input to the system by users of the devices. FIG. 8A illustrates a method performed by the server(s) 120 to ensuring the speech processing data on the device(s) is up-to-date. The server(s) 120 may perform the steps of FIG. 8A with respect to multiple unique IDs of the system.

The server(s) 120 determines (130) a unique ID associated with one or more users. The server(s) 120 also determines (132) a spoken command history associated with the unique ID. Moreover, the server(s) 120 determines (134) one or more most frequently input commands represented in the usage history.

The server(s) 120 determines (802) whether the determined most frequently input commands are represented in speech processing data currently stored by one or more devices associated with the unique ID. If so, the server(s) 120 waits a predetermined amount of time (e.g., an amount of time to let the usage history gather more input commands) prior to recommencing the method at step 130. For example, the server(s) 120 may perform the steps of FIG. 8A with respect to a given unique ID twice a day.

If the server(s) 120 determines at least one determined frequently input command is not represented in speech processing data currently stored by the user device(s), the server(s) 120 may generate (804) speech processing data specific to all of the one or more determined most frequently input commands. The generated speech processing data may be specific to speech recognition processing, natural language processing, and/or text-to-speech processing. The server(s) 120 sends (138) the generated speech processing data to the device(s) associated with the unique ID. For example, the server(s) 120 may send speech recognition processing data, natural language processing data, and/or text-to-speech processing data to the device(s). The server(s) 120 also sends (806) an instruction to the device(s) to delete all of the previously received and stored speech processing data. The server(s) 120 may send the speech processing data and the instruction to the device(s) separately or together.

Alternatively, if the server(s) 120 determines at least one determined frequently input command is not represented in speech processing data currently stored by the user device(s), the server(s) 120 may generate (808) speech processing data specific to only the one or more determined frequently input commands not represented in speech processing data currently stored by the device(s). The server(s) 120 sends (138) the generated speech processing data to the device(s) associated with the unique ID.

The server(s) 120 may keep a record of devices with the speech processing data stored thereon. Once the server(s) 120 determines the most frequently input command(s), the server(s) 120 may compare the most frequently input command(s) to the command represented in speech processing data currently stored on the device(s) associated with the unique ID to determine one or more commands represented in the currently stored speech processing data that are no longer "most frequent." The server(s) 120 may then send (810) an instruction to the device(s) to delete portions of the previously stored speech processing data associated with command that are no longer "most frequent." The server(s) 120 may send the speech processing data and the instruction to the device(s) separately or together.

The system may be configured to maintain a predetermined hit-to-hint ratio. When the device 110 is able to process an input utterance locally, the device 110 generates a "hit" indicator. Conversely, when the device 110 is unable to process an input utterance locally, the device 110 sends audio data corresponding to the input utterance to the server(s) 120 and, in return, receives "hint" data corresponding to a textual interpretation of the input utterance as determined by the server(s) 120. The system may be configured to update the speech processing data on the device 110 to maintain the device's hit-to-hint ratio at a predetermine ratio, such as fifty (50) percent at all times. The system may periodically evaluate the device's hit-to-hint ratio and, when the ratio falls below fifty (50) percent, update the speech processing data stored by the device 110 according to the teachings of FIG. 8A.

To determine the most frequently input command(s) represented at step (134) in FIG. 8A, the server(s) 120 may sort a database of commands associated with "hint" indicators by frequency. The server(s) 120 may update the speech processing data stored by the device 110 frequently used commands (e.g., commands associated with a minimum number of hint indicators) from the database including the commands associated with the "hint" indicators.

In addition to including data specific to most frequently input commands, the speech processing data stored by the device 110 may include data specific to non-frequently input commands that should nonetheless by output by the system with little to no latency. Such commands corresponding to, for example, commands requesting the starting of a timer, commands requesting the setting of an alarm, commands requesting the output of a joke, and the like.

One example of a command to be executed with reduced latency is a command corresponding to control of a device proximate to a local device 110. Such a device to be controlled may be controlled as a result of home automation for example a light switch, thermostat, etc. The controllable device may be connected to the local device 110 (or 1110 discussed below) across a home network, through a hard-wired connection, over the Internet, or through some other means.

Figure 8B:
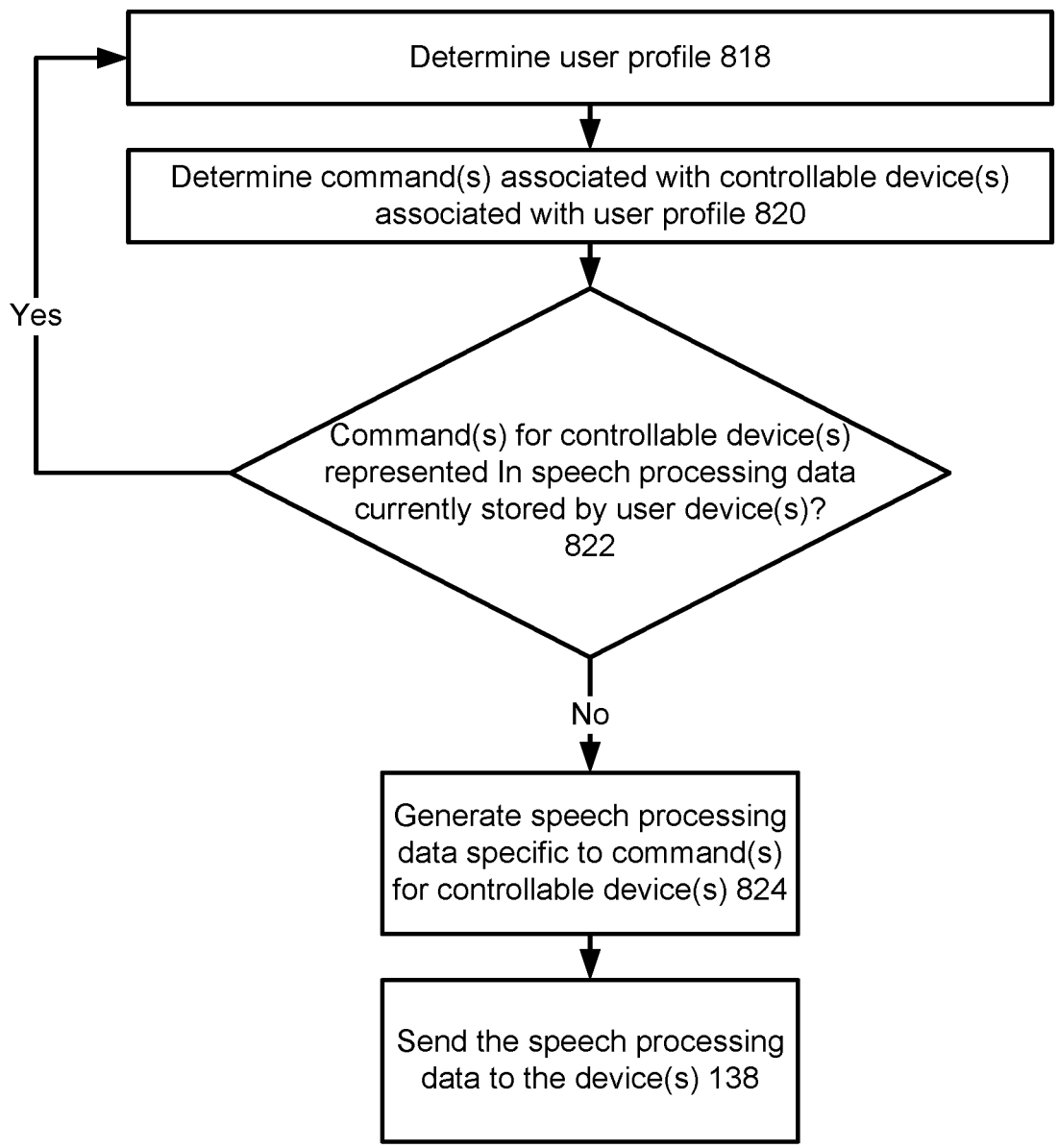
FIG. 8B is a process flow diagram illustrating a method for ensuring speech processing data stored on a local device is up-to-date according to embodiments of the present disclosure.

For example, as shown in FIG. 8B, the system may determine (818) a user profile, determine (820) command(s) associated with one or more controllable devices associated with the user profile and check (822) to see if the command(s) for the controllable device(s) are represented in the speech processing data currently stored by the user device(s). If so (822: Yes), the system may check another user profile. If not (822: No), the system may generate (824) speech processing data specific to the command(s) for the controllable device(s) and may send (138) the speech processing data to the local device(s). The system may also include an instruction to delete old speech processing data.

As may be appreciated, the steps of FIG. 8A/8B, or other steps, may be performed to configure a local device to perform speech processing for other types of commands as determined by the system.

A single device 110 may include all the components necessary to process a command to determine an output. FIG. 9 conceptually illustrates such a device 110. The device 110 may include the wakeword detection component 220.

The device 110 may further include a speech recognition component 902. Whereas the speech recognition component 250 of the server(s) 120 is configured to perform speech recognition processing with respect to all possible input commands of the system, the speech recognition component 902 may be configured only with respect to the frequently input commands or other commands to be processed by the local device 110. The speech recognition component 902 may include an acoustic front end and a speech recognition engine. Moreover, whereas the server(s) 120 stores acoustic models 353 and language models 354 that enable the server(s) 120 to recognition all system input commands, the device 110 may store speech recognition data such as acoustic models and language models specific to the commands (such as frequently input commands) to be handled by the local device 110 and/or specific to user(s) associated with the local device 110.

The device 110 may additionally include a natural language component 904. Whereas the natural language component 260 of the server(s) 120 is configured to perform natural language processing with respect to all possible input commands of the system, the natural language component 904 may be configured only with respect to the frequently input commands or other commands to be processed by the local device 110. The natural language component 904 may include recognizers specific to the domains associated with the frequently input commands. Each recognizer of the natural language component 904 may include an NER component and an IC component. Whereas the server(s) 120 includes a natural language storage 473 and entity library 483 that enable the server(s) 120 to perform natural language processing with respect to all system input commands, the device 110 may include a natural language storage and/or an entity library storage that include speech recognition data such as device domains, domain grammars, domain intents, and gazetteers specific to the commands (such as frequently input commands) to be handled by the local device 110 and/or specific to user(s) associated with the local device 110.

The device 110 may additionally include a text-to-speech (TTS) component 906. Whereas the TTS component 280 of the server(s) 120 is configured to perform TTS processing with respect to all possible input commands of the system, the TTS component 906 may be configured only with respect to the frequently input commands or other commands to be processed by the local device 110. Whereas the server(s) 120 includes a voice unit storage 672 and TTS storage 620 that enable the server(s) 120 to perform TTS processing with respect to all system input commands, the device 110 may include a voice unit storage and TTS storage that include speech recognition data such as voice inventories/unit databases, parametric synthesis configuration data, or other TTS data specific to the commands (such as frequently input commands) to be handled by the local device 110 and/or specific to user(s) associated with the local device 110. The TTS component 906 may also include a selection of pre-stored TTS output (such as already selected units, already synthesized speech, or the like) that correspond to canned responses to commands that may be processed locally. For example, if a local device is configured to handle utterances related to a local thermostat, the TTS component 906 may include pre-synthesized speech along the lines of "your thermostat has been changed," thus allowing the local device to output a TTS acknowledgement of the locally-handled utterance without needing to communicate with the server for TTS purposes.

The TTS component 906 may also include a selection of pre-stored TTS output (such as already selected units, already synthesized speech, or the like) that correspond to canned responses to commands that may be processed locally. For example, if a local device is configured to handle utterances related to a local thermostat, the TTS component 906 may include pre-synthesized speech along the lines of "your thermostat has been changed," thus allowing the local device to output a TTS acknowledgement of the locally-handled utterance without needing to communicate with the server for TTS purposes. The device 110 may include compressed files corresponding to vast amounts of pre-generated synthesized speech responsive to a limited number of input commands (e.g., the frequently input commands). Thus, the server(s) 120 may update the compressed files when the server(s) 120 updates other portions of speech processing data stored by the device 110. The device 110 may store a first set of compressed files that may be used to output content to a first user of the device 110, a second set of compressed filed that may be used to output content to a second user of the device 110, etc.

The local device 110 (or associated storage) may also include user profile data corresponding to one or more user profile(s) 702 associated with the device 110. Thus the speech processing data used by the device 110 may include user profile data used to process and execute utterance commands.

Figure 10A:
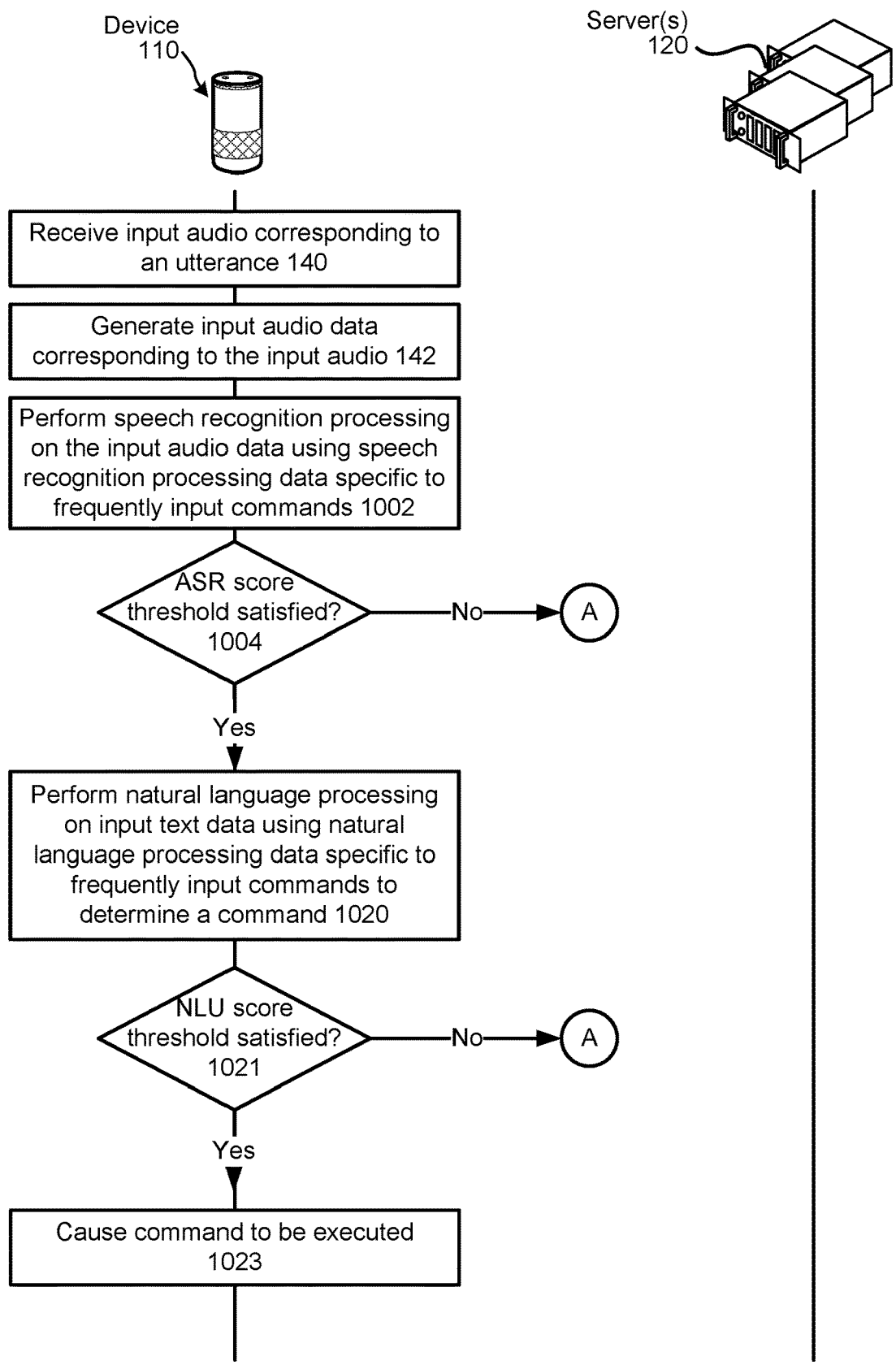

FIGS. 10A and 10B illustrate the processing and execution of a command by a system including the device 110 illustrated in and described with respect to FIG. 9. The device 110 receives (140) input audio corresponding to an utterance and generates (142) input audio data corresponding to the input audio. The device 110 performs (1002) speech recognition processing on the input audio data using speech recognition processing data specific to frequently input commands. In performing speech recognition processing, the device 110 assigns a score to each determined textual interpretation potentially corresponding to the utterance. The device 110 determines (1004) whether a generated speech recognition score satisfies (e.g., meets or exceeds) a threshold. The threshold represents a system confidence that textual interpretations associated with scores satisfying the threshold in fact correspond to the input utterance. When the device 110 determines a generated speech recognition score for an input command satisfies the threshold, the device 110 may increment a usage counter (e.g., "hit" counter) associated with the command by one (1), thus enabling the device to track how many times it successfully performed ASR.

If the device 110 determines one or more of the generated speech recognition scores satisfy the threshold (1004: Yes) (e.g., representing that the input utterance corresponds to a frequently input command), the device 110 performs (1020) natural language processing on the input text data using natural language processing specific to the frequently input commands to determine a command corresponding to the input utterance. The device 110 then determines (1021) whether an NLU generated score satisfies (e.g., meets or exceeds) a threshold representing how well the device 110 understood the post-ASR text. If the device 110 determines one or more of the generated NLU scores satisfy the NLU score threshold (1021: Yes) the local device may cause (1023) the command to be executed, which may include determining output data responsive to the command. When the device 110 determines an NLU score for an input command satisfies the threshold, the device 110 may increment a usage counter (e.g., "hit" counter) associated with the command by one (1), thus enabling the device to track how many times it successfully performed NLU.

The determined output data may correspond to at least a portion of a stored compressed file corresponding to pre-generated synthesized speech. Alternatively, the device 110 may determine output data corresponding to text data. If the device 110 is not configured to perform text-to-speech processing, the device 110 may send output text data to the server(s) 120, which performs text-to-speech processing on the output text data to generate output audio data, and which sends the output audio data to the device 110. The device 110 can then output audio corresponding to at least a portion of the stored compressed file or the server(s) 120 generated synthesized speech.

The local device 110 may also, prior to causing (1023) the command to be executed, check to see if the command is executable by the local device 110, or another device in communication with the local device 110. If not, the local device 110 may send the command and/or related audio data, ASR data and/or NLU data to the server(s) 120 for processing (for example in steps 1006-1018.

If the device 110 determines none of the generated speech recognition scores satisfy the ASR threshold (1004: No) (e.g., representing that the input utterance does not correspond to a frequently input command), or none of the generated NLU scores satisfy the NLU threshold (1021: No) the device 110 (referring to FIG. 10B) sends (1006) the input audio data to the server(s) 120.

The server(s) 120 performs (1008) speech recognition processing on the input audio data using speech recognition data associated with all system inputtable commands to generate input text data. The server(s) 120 performs (1010) natural language processing on the input text data to determine a command corresponding to the utterance. The server(s) 120 executes the command and determines (1012) output data responsive to the command. The server(s) 120 may determine the output data from a storage maintained and/or operated by the server(s) 120. The server(s) 120 may alternatively receive the output data from a content source server(s) 125. If the output data is text data, the server(s) 120 performs (1014) text-to-speech processing on the output text data to generate output audio data. The server(s) 120 then sends (1016) the output audio data to the device 110. The device 110 outputs (1018) audio corresponding to the output audio data.

Figure 11:
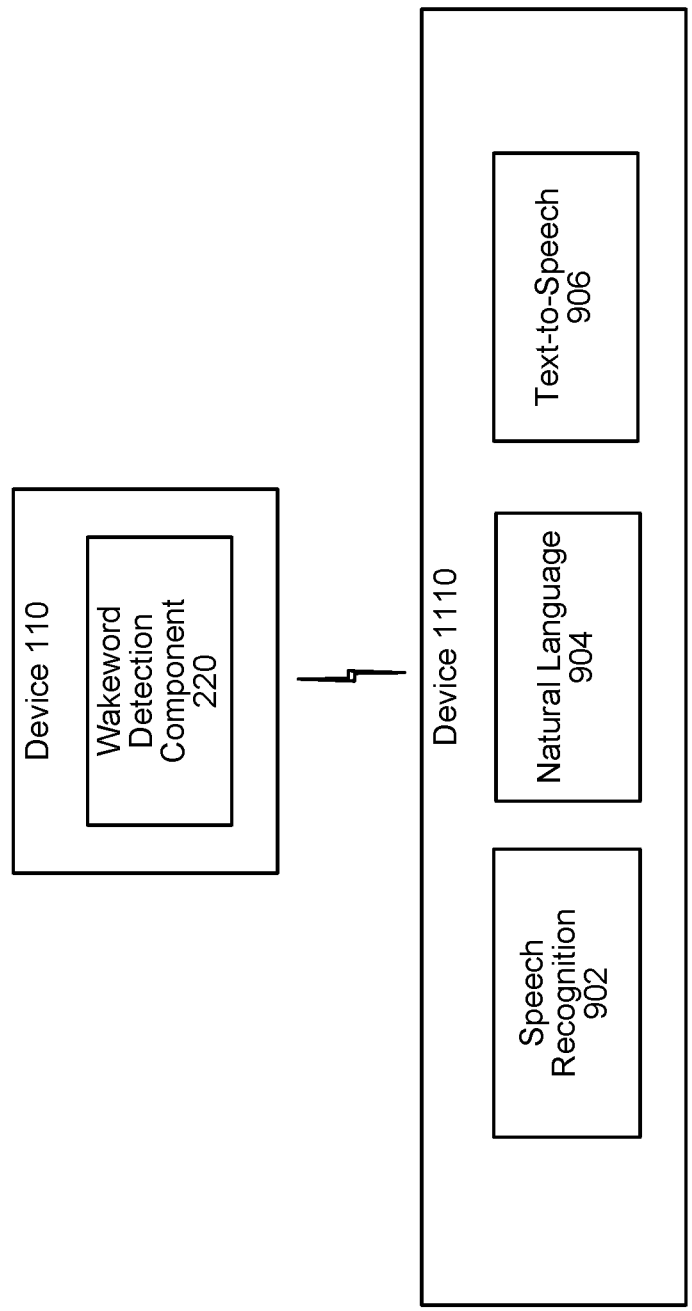
FIG. 11 is a conceptual diagram of a pair of devices local to a user according to embodiments of the present disclosure.

Multiple devices (110/1110) may include all the components necessary to process a command to determine an output. FIG. 11 conceptually illustrates such devices (110/1110). Both of the devices (110/1110) may be local to a user. In one example a device 110 is capable of audio capture and is located where audio for a user's utterance may be captured while device 1110 may not necessarily be capable of audio capture and may be located in a user's home somewhere (such as a local basement server, local office server, or the like) and be capable of communicating with device 110 (for example over a local network) and server(s) 120 (for example, over the Internet) to assist with various processing steps as described herein. The device 110 may also be capable of communicating with controllable device(s) such as a light switch, thermostat, or other home appliances. Thus, the device 110 and the device 1110 may communicate using a local network (e.g., non-Internet) connection, such as Bluetooth, WiFi, ZigBee, other wireless connection, Ethernet, other wired connection, etc. The device 110 may include the wakeword detection component 220 while the device 1110 may include the speech recognition component 902, the natural language component 904, and/or the TTS component 906. In such a configuration, upon detection of the wakeword by device 110, device 110 may open a speech processing connection with device 1110 (instead of server(s) 120) to send audio data of an utterance to the device 1110 for speech processing. The device 1110 may thus perform duties of, and include components similar to, the server(s) 120, and/or the device 110, depending on the configuration of device 1110. Other division/arrangements of components among device 110, device 1110, and server(s) 120 are also possible. Thus the device 1110 may perform any operations described herein with regard to device 110.

FIGS. 12A and 12B illustrate the processing and execution of a command by a system including the devices (110/1110) illustrated in and described with respect to FIG. 11. The device 110 receives (140) input audio corresponding to an utterance. The device 110 generates input audio data corresponding to the input audio, and sends (1202) the input audio data to the device 1110.

The device 1110 and the server(s) 120 then perform the steps 142 through 1014 illustrated in and described with respect to FIGS. 10A and 10B. That is, the device 1110 performs steps 1002-1023 of FIG. 10A and the server(s) 120 performs steps 1008-1014 of FIG. 10B. The server(s) 120 sends (1204) output audio data to the device 1110, and the device 1110 sends (1206) the output audio data to the device 110. Alternatively, the server(s) 120 may sends the output audio data to the device 110 without the intervention of the device 1110. The device 110 outputs (1018) audio corresponding to the output audio data.

If the device 1110 determines one or more of the generated speech recognition scores satisfy the threshold (e.g., representing that the input utterance corresponds to a frequently input command), the device 1110 performs (1020) natural language processing on the input text data using natural language processing specific to the frequently input commands to determine a command corresponding to the input utterance. When the device 1110 determines a generated speech recognition score for an input command satisfies the threshold, the device 1110 increments a usage counter (e.g., "hit" counter) associated with the command by one (1). The device 1110 then determines (1022) output data responsive to the command. The determined output data may correspond to at least a portion of a stored compressed file corresponding to pre-generated synthesized speech. Alternatively, the device 1110 may determine output data corresponding to text data. If the device 1110 is not configured to perform text-to-speech processing, the device 1110 sends output text data to the server(s) 120, which performs text-to-speech processing on the output text data to generate output audio data, and which sends the output audio data to the device 1110. The device 1110 sends the output audio data to the device 110, which outputs audio corresponding to at least a portion of the stored compressed file or the server(s) 120 generated synthesized speech.

As noted above, the system may send speech processing data to a device 110 and/or 1110 for purposes of the device 110 and/or 1110 to store and use for future speech processing. The speech processing data may include data that is referenced during speech processing or data that includes executable instructions for speech processing. The speech processing data may include, but is not limited to, data used to perform ASR, NLU, TTS and/or command execution. The speech processing data may thus include, for example, ASR data such as acoustic model data, language model data or other data that may be used by a speech recognition component such as 902. The speech processing data may also include, for example, NLU data such as domain data, intent data, slot data, knowledge base data, gazetteer data, lexicon data, entity data, data for NER processing, data for IC processing, language model data or other data that may be used by a natural language component such as 904. The speech processing data may also include, for example, TTS data such as voice inventory data, unit selection data, parametric synthesis data, or other data that may be used by a TTS component such as 906. The speech processing data may also include information corresponding to a user or device profile. The speech processing data may also include data used to execute a user command, for example an application programming interface (API) call that can be sent to another device for the other device to execute. The speech processing data may also include other data.

The speech processing data may include a whole speech processing model (e.g., a complete language model or acoustic model), a partial model (e.g., part of a language model that can be used to supplement an existing language model), or other data. Thus the speech processing data may be sent to the device 110/1110 may be used by the device 110/1110 to update current speech processing data/functionality available to the device 110/1110.

Figure 14:
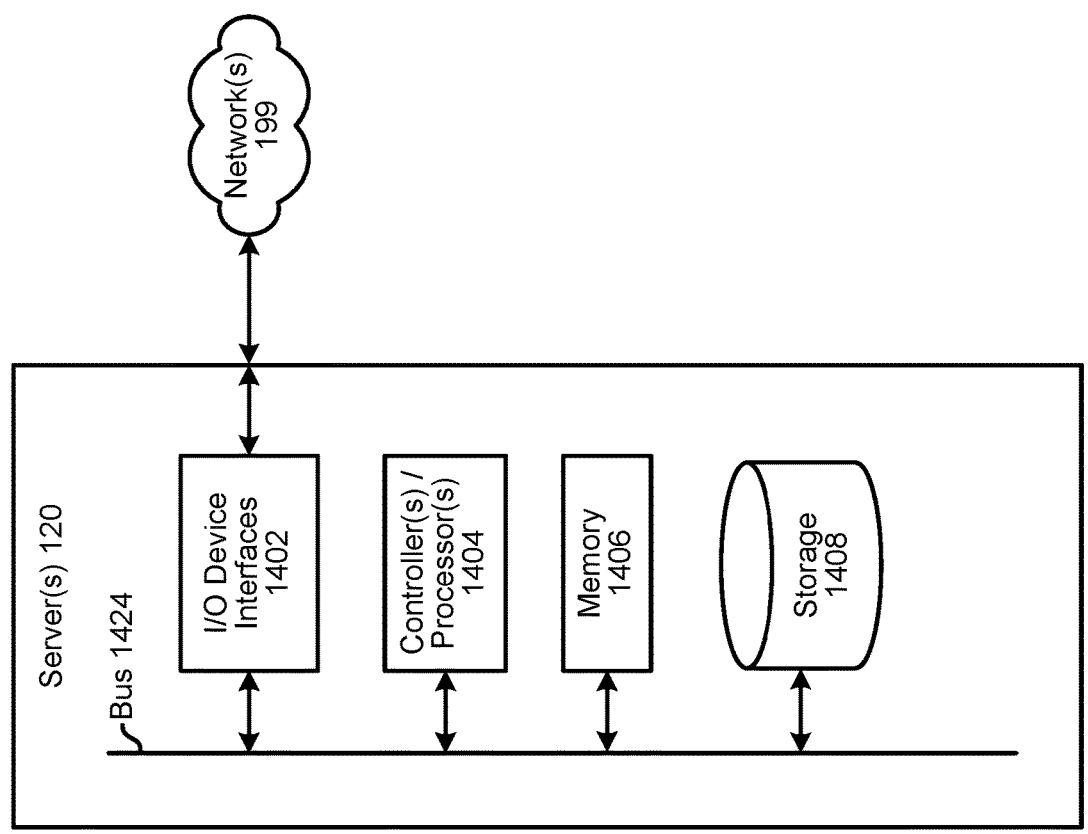
FIG. 14 is a block diagram conceptually illustrating example components of a server according to embodiments of the present disclosure.

FIG. 13 is a block diagram conceptually illustrating a user device 110/1110 that may be used with the system. FIG. 14 is a block diagram conceptually illustrating example components of a remote device, such as the server(s) 120, which may assist with speech recognition processing, natural language processing, or command processing. Multiple servers 120 may be included in the system, such as one server 120 for performing speech recognition processing, one server 120 for performing natural language processing, etc. In operation, each of these devices (or groups of devices) may include computer-readable and computer-executable instructions that reside on the respective device (110/1110/120), as will be discussed further below.

Each of these devices (110/1110/1110/120) may include one or more controllers/processors (1304/1404), which may each include a central processing unit (CPU) for processing data and computer-readable instructions, and a memory (1306/1406) for storing data and instructions of the respective device. The memories (1306/1406) may individually include volatile random access memory (RAM), non-volatile read only memory (ROM), non-volatile magnetoresistive memory (MRAM), and/or other types of memory. Each device (110/1110/120) may also include a data storage component (1308/1408) for storing data and controller/processor-executable instructions. Each data storage component (1308/1408) may individually include one or more non-volatile storage types such as magnetic storage, optical storage, solid-state storage, etc. Each device (110/1110/120) may also be connected to removable or external non-volatile memory and/or storage (such as a removable memory card, memory key drive, networked storage, etc.) through respective input/output device interfaces (1302/1402).

Computer instructions for operating each device (110/1110/120) and its various components may be executed by the respective device's controller(s)/processor(s) (1304/1404), using the memory (1306/1406) as temporary "working" storage at runtime. A device's computer instructions may be stored in a non-transitory manner in non-volatile memory (1306/1406), storage (1308/1408), or an external device(s). Alternatively, some or all of the executable instructions may be embedded in hardware or firmware on the respective device in addition to or instead of software.

Each device (110/1110/120) includes input/output device interfaces (1302/1402). A variety of components may be connected through the input/output device interfaces (1302/1402), as will be discussed further below. Additionally, each device (110/1110/120) may include an address/data bus (1324/1424) for conveying data among components of the respective device. Each component within a device (110/1110/120) may also be directly connected to other components in addition to (or instead of) being connected to other components across the bus (1324/1424).

Referring to FIG. 13, the device 110 may include input/output device interfaces 1302 that connect to a variety of components such as an audio output component such as a speaker 1312, a wired headset or a wireless headset (not illustrated), or other component capable of outputting audio. The device 110 may also include an audio capture component. The audio capture component may be, for example, a microphone 1320 or array of microphones, a wired headset or a wireless headset (not illustrated), etc. If an array of microphones is included, approximate distance to a sound's point of origin may be determined by acoustic localization based on time and amplitude differences between sounds captured by different microphones of the array.

Via antenna(s) 1314, the input/output device interfaces 1302 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system 100 may be distributed across a networked environment. The I/O device interface (1302/1402) may also include communication components that allow data to be exchanged between devices such as different physical servers in a collection of servers or other components.

The components of the device(s) 110/1110 and the server(s) 120 may include their own dedicated processors, memory, and/or storage. Alternatively, one or more of the components of the device(s) 110/1110 and the server(s) 120 may utilize the I/O interfaces (1302/1402), processor(s) (1304/1404), memory (1306/1406), and/or storage (1308/1408) of the device(s) 110 and server(s) 120, respectively. Thus, the speech recognition component 250 may have its own I/O interface(s), processor(s), memory, and/or storage; the natural language component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110/1110 and the server(s) 120, as described herein, are exemplary, and may be located as a stand-alone device or may be included, in whole or in part, as a component of a larger device or system.

Figure 15:
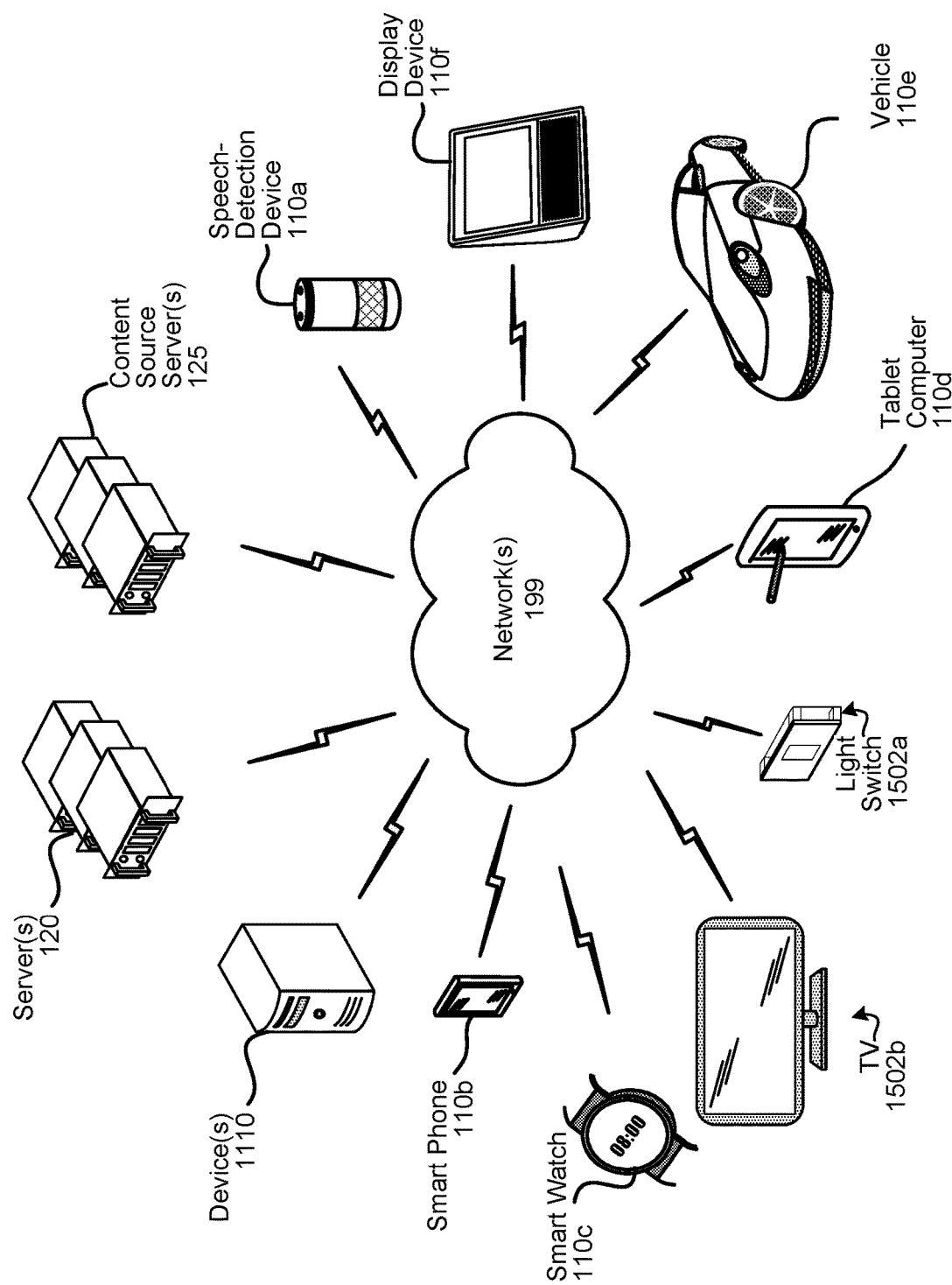
FIG. 15 illustrates an example of a computer network for use with the speech processing system.

As illustrated in FIG. 15, multiple devices (110a-110f, 1110, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, and/or one or more devices 1110 may be connected to the network(s) 199 through a wireless service provider, over a WiFi or cellular network connection, or the like. Other devices may also include device(s) that are controllable using voice commands such as light switch 1502a, television 1502b, or the like. Such controllable device(s) may be associated with a user profile 702. The local device 110/1110 may be configured to control such device(s) using techniques such as those described in FIG. 8B for example. Other devices are included as network-connected support devices, such as the server(s) 120, the content source server(s) 125, or others. The support devices may connect to the network(s) 199 through a wired connection or wireless connection. Networked devices may capture audio using one-or-more built-in or connected microphones or other audio capture devices, with processing performed by speech recognition components, natural language components, or other components of the same device or another device connected via the network(s) 199, such as the speech recognition component 250, the natural language component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method performed by a user device, comprising:
   receiving speech processing model data from a remote device, the speech processing model data being received based at least in part on usage history data representing a first speech input was received at least a number of times over a duration of time;
   after receiving the speech processing model data, receiving a second speech input;
   using the speech processing model data, performing speech recognition processing on first audio data, corresponding to the second speech input, to generate first speech recognition output data;
   determining a first confidence score representing the first speech recognition output data corresponds to the first speech input;
   determining the first confidence score fails to satisfy a threshold confidence score;
   after determining the first confidence score fails to satisfy the threshold confidence score, sending the first audio data to the remote device;
   receiving, from the remote device, first output data responsive to the second speech input; and
   causing a first output corresponding to the first output data.

2. The computer-implemented method of claim 1, further comprising:
   receiving a third speech input;
   using the speech processing model data, performing speech recognition processing on second the third audio data, corresponding to the third speech input, to generate second speech recognition output data;
   determining a second confidence score representing the second speech recognition output data corresponds to the first speech input;
   determining the second confidence score satisfies the threshold confidence score;
   after determining the second confidence score satisfies the threshold confidence score, determining second output responsive to the first speech input; and
   causing a second output corresponding to the second output data.

3. The computer-implemented method of claim 2, further comprising:
   receiving the second output data from the remote device, wherein the second output data comprises synthesized speech responsive to the first speech input; and
   prior to receiving the third speech input, storing the second output data,
   wherein determining the second output data includes identifying the second output data in storage.

4. The computer-implemented method of claim 1, further comprising:
   receiving, from the remote device, an instruction to delete a portion of the speech processing model data associated with a third speech input, the instruction being received based at least in part on the usage history data representing the third speech input was received less than the number of times over the duration of time.

5. A user device comprising:
at least one processor; and
at least one memory including instructions that, when executed by the at least one processor, cause the user device to:
receive speech processing model data from a remote device, the speech processing model data being received based at least in part on usage history data representing a first speech input was received at least a number of times over a duration of time, the speech processing model data comprising at least a first portion for use in speech recognition processing;
after receiving the speech processing model data, receive a second speech input;
using the speech processing model data, perform speech recognition processing on first audio data corresponding to the second speech input to generate first speech recognition output data;
determine a first confidence score representing the first speech recognition output data corresponds to the first speech input;
determine the first confidence score fails to satisfy a threshold confidence score;
send the first speech recognition output data to the remote device;
receive, from the remote device, first output data responsive to the second speech input; and
cause a first output corresponding to the first output data.

6. The user device of claim 5, wherein the at least one memory further includes instructions that, when executed by the at least one processor, further cause the user device to:
receive a third speech input;
using the speech processing model data, perform speech recognition processing on second audio data, corresponding to the third speech input, to generate second speech recognition output data;
determine a second confidence score representing the second speech recognition output data corresponds to the first speech input;
determine the second confidence score satisfies the threshold confidence score;
after determining the second confidence score satisfies the threshold confidence score, determine second output data responsive to the first speech input; and
cause a second output corresponding to the second output data.

7. The user device of claim 6, wherein the at least one memory further includes instructions that, when executed by the at least one processor, further cause the user device to:
receive the second output data from the remote device, wherein the second output data comprises synthesized speech responsive to the first speech input; and
prior to receiving the third speech input, store the second output data,
wherein determining the second output data includes identifying the second output data in storage.

8. The user device of claim 6, wherein the at least one memory further includes instructions that, when executed by the at least one processor, further cause the user device to:
after determining the second confidence score satisfies the threshold confidence score, perform natural language processing on the second speech recognition output data.

9. The user device of claim 5, wherein the at least one memory further includes instructions that, when executed by the at least one processor, further cause the user device to:
receive, from the remote device, an instruction to delete a portion of the speech processing model data associated with a third speech input, the instruction being received based at least in part on the usage history data representing the third speech input was received less than the number of times over the duration of time.

10. The user device of claim 5, wherein the at least one memory further includes instructions that, when executed by the at least one processor, further cause the user device to:
receive a third speech input;
using the speech processing model data, perform speech recognition processing on second audio data, corresponding to the third speech input, to generate second speech recognition output data;
determine a second confidence score representing the second speech recognition output data corresponds to the first speech input;
determine the second confidence score fails to satisfy the threshold confidence score;
generate an indicator representing the speech recognition processing of the second audio data was unsuccessful;
send the indicator to the remote device; and
after sending the indicator, receive second speech processing model data from the remote device.

11. The user device of claim 5, wherein the speech processing model data further comprises at least a second portion for use in natural language understanding processing, at least a third portion for use in text-to-speech processing, or at least a fourth portion corresponding to user profile data.

12. A computer-implemented method performed by a user device, comprising:
receiving speech processing model data from a remote device, the speech processing model data being received based at least in part on usage history data representing a first speech input was received at least a number of times over a duration of time, the speech processing model data comprising at least a first portion for use in speech recognition processing;
after receiving the speech processing model data, receiving a second speech input;
using the speech processing model data, performing speech recognition processing on first audio data, corresponding to the second speech input, to generate first speech recognition output data;
determining a first confidence score representing the first speech recognition output data corresponds to the first speech input;
determining the first confidence score fails to satisfy a threshold confidence score;
generating an indicator representing the speech recognition processing of the first audio data was unsuccessful;
sending the indicator to the remote device; and
after sending the indicator, receiving second speech processing model data from the remote device.

13. The computer-implemented method of claim 12, further comprising:
receiving a third speech input;
using the speech processing model data, performing speech recognition processing on second audio data, corresponding to the third speech input, to generate second speech recognition output data;
determining a second confidence score representing the second speech recognition output data corresponds to the first speech input;
determining the second confidence score satisfies the threshold confidence score;

after determining the second confidence score satisfies the threshold confidence score, determining first output data responsive to the first speech input; and causing a first output corresponding to the first output data.

14. The computer-implemented method of claim 13, further comprising:
receiving the first output data from the remote device, wherein the first output data comprises synthesized speech responsive to the first speech input; and
prior to receiving the third speech input, storing the first output data,
wherein determining the first output data includes identifying the first output data in storage.

15. The computer-implemented method of claim 13, further comprising:
after determining the second confidence score satisfies the threshold confidence score, performing natural language processing on the second speech recognition output data.

16. The computer-implemented method of claim 13, wherein:
the user device receives the third speech input and causes the first output; and
a second device receives the speech processing model data, performs the speech recognition processing on the second audio data, and determines the first output data.

17. The computer-implemented method of claim 12, further comprising:
receiving a third speech input;
using the speech processing model data, performing speech recognition processing on second audio data, corresponding to the third speech input, to generate second speech recognition output data;
determining a second confidence score representing the second speech recognition output data corresponds to the first speech input;
determining the second confidence score fails to satisfy the threshold confidence score;
sending the second speech recognition output data to the remote device;
receiving, from the remote device, first output data responsive to the third speech input; and
causing a first output corresponding to the first output data.

18. The computer-implemented method of claim 12, further comprising:
receive, from the remote device, an instruction to delete a portion of the speech processing model data associated with a third speech input, the instruction being received based at least in part on the usage history data representing the third speech input was received less than the number of times over the duration of time.

19. The computer-implemented method of claim 12, wherein the speech processing model data further comprises at least a second portion for use in natural language understanding processing, at least a third portion for use in text-to-speech processing, or at least a fourth portion corresponding to user profile data.

20. The computer-implemented method of claim 12, wherein:
the first speech input corresponds to a first command; and
the speech processing model data is received based at least in part on the first command being a most frequently received command of a plurality of commands represented in the usage history data.

* * * * *